(12) United States Patent
Katsuhito et al.

(10) Patent No.: US 7,903,094 B2
(45) Date of Patent: Mar. 8, 2011

(54) INFORMATION PROCESSING APPARATUS, OPERATION INPUT METHOD, AND SENSING DEVICE

(75) Inventors: Obi Katsuhito, Saitama-ken (JP); Toshihiko Horie, Saitama-ken (JP)

(73) Assignee: WACOM Co., Ltd, Saitama-Ken (JP)

( * ) Notice: Subject to any disclaimer, the term of this patent is extended or adjusted under 35 U.S.C. 154(b) by 899 days.

(21) Appl. No.: 11/812,672

(22) Filed: Jun. 20, 2007

(65) Prior Publication Data
US 2008/0042985 A1 Feb. 21, 2008

(30) Foreign Application Priority Data
Jun. 23, 2006 (JP) ................................. 2006-174196

(51) Int. Cl.
*G09G 5/00* (2006.01)
(52) U.S. Cl. ....................... 345/173; 345/179; 178/18.07
(58) Field of Classification Search .......... 345/173–177, 345/179; 178/18.01–18.07, 19.05; 382/314
See application file for complete search history.

(56) References Cited

U.S. PATENT DOCUMENTS

| | | | | |
|---|---|---|---|---|
| 4,686,332 A | * | 8/1987 | Greanias et al. | 345/173 |
| 5,682,019 A | * | 10/1997 | Katsurahira et al. | 178/18.07 |
| 7,084,933 B2 | * | 8/2006 | Oh et al. | 349/12 |
| 2007/0152976 A1 | | 7/2007 | Townsend et al. | |

FOREIGN PATENT DOCUMENTS

| | | |
|---|---|---|
| DE | 103 10 794 | 9/2004 |
| EP | 1 550 941 | 7/2005 |
| JP | 09 138730 | 5/1997 |
| WO | WO 2006/115946 | 11/2006 |
| WO | WO 2007/066488 | 6/2007 |

* cited by examiner

*Primary Examiner* — Quan-Zhen Wang
*Assistant Examiner* — Tom V Sheng
(74) *Attorney, Agent, or Firm* — Berenato & White, LLC

(57) ABSTRACT

An information processing apparatus includes an operation surface, a first sense unit for electrically detecting whether the operation surface is directly touched, a second sense unit for detecting whether the position pointing device approaches or contacts the operation surface based on an electromagnetic interaction, an approach detector for detecting whether the position pointing device approaches a first detection range from the operation surface and whether the position pointing device approaches a second detection range based on an output from the second sense unit. The second detection range is closer to the operation surface than the first detection range. The information processing apparatus further includes a display controller for disabling display processing based on an output from the first sense unit if the approach detector determines that the position pointing device approaches the second detection range and for performing display processing based on an output from the second sense unit.

23 Claims, 12 Drawing Sheets

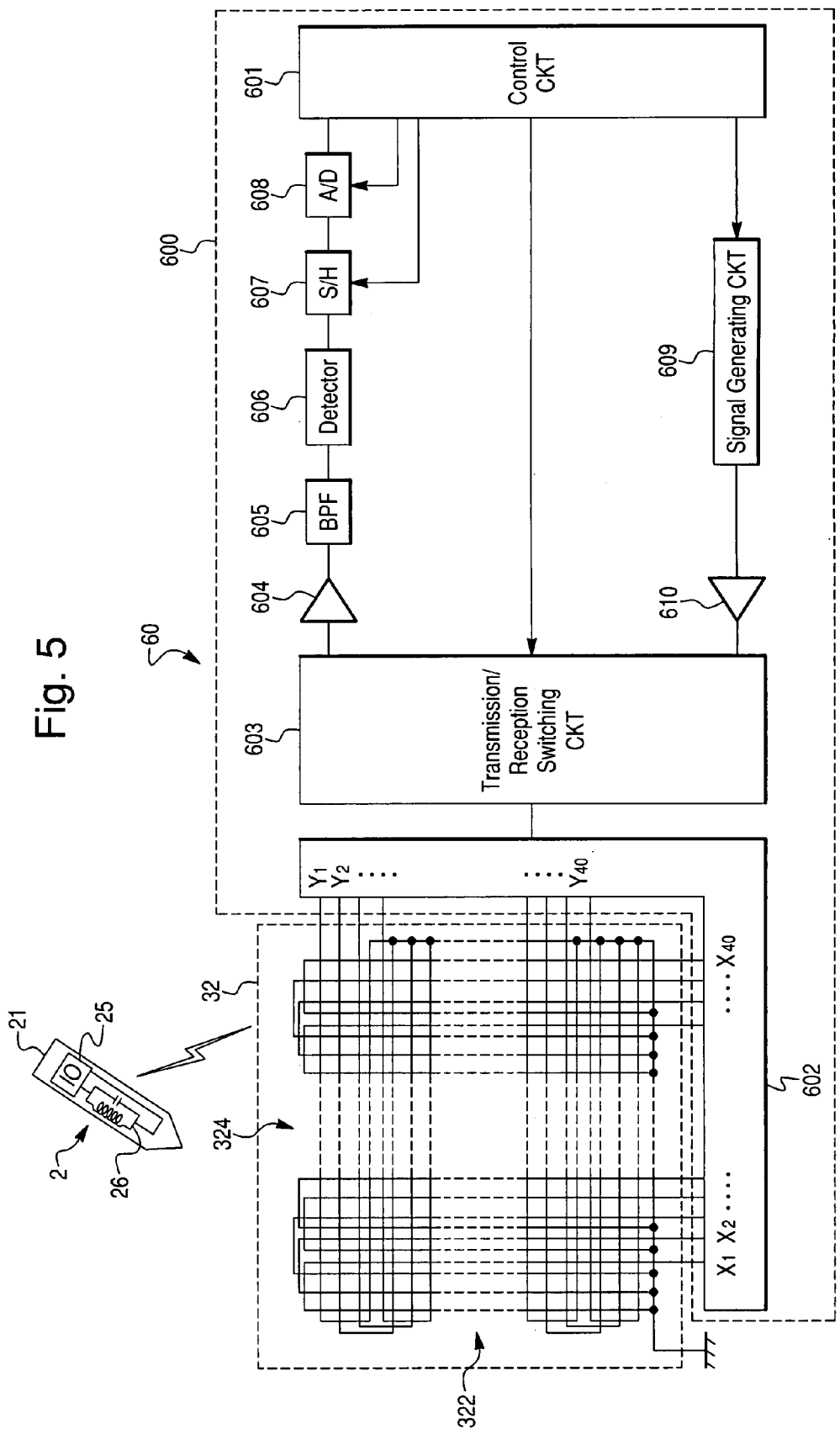

INFORMATION PROCESSING APPARATUS, OPERATION INPUT METHOD, AND SENSING DEVICE

CROSS REFERENCES TO RELATED APPLICATIONS

The present application claims priority from Japanese Application No. P2006-174196 filed on Jun. 23, 2006, the disclosure of which is incorporated herein by reference.

FIELD OF THE INVENTION

The present invention relates to an information processing apparatus and an operation input method usable with a personal computer apparatus, and a sensing device for detecting an input operation of the information processing apparatus. More particularly, the present invention relates to an information processing apparatus, an operation input method, and a sensing device in which a personal computer apparatus can be operated by touching a display surface with a finger, a pen (e.g., stylus), or the like.

BACKGROUND OF THE INVENTION

Various operation input devices have been used with an information processing apparatus, such as a notebook-sized computer. For example, a keyboard having keys corresponding to the alphabet, numbers, and symbols has been used. Additionally, a touch panel which can be operated when a user touches the panel with a finger or the like has also been used with the information processing apparatus.

When a user touches the touch panel with a finger or the like, it is possible to change a display position of a pointer displayed on a screen of the information processing apparatus. A plurality of electrodes may be embedded in an operation surface of the touch panel and a touched position may be determined by detecting electrostatic capacity changes between the electrodes when the user touches the operation surface with the finger or the like.

Alternatively, an operation input device different from the touch panel may be used with the information processing apparatus. For example, an operation input device called a "pen tablet" may be used. In this case, a user touches an operation surface with a pen-shaped input device (stylus) designed for use with the pen tablet so that a user is able to perform an input operation which corresponds to the position touched with the stylus.

The pen tablet may be an electromagnetic induction type pen tablet in which a plurality of loop coils are embedded in an operation surface and a magnetic field is generated from the loop coils. The stylus which serves as a position pointing device includes coils that react with a magnetic field generated by the loop coils of the pen tablet. The electromagnetic induction type pen tablet is able to detect the position of the stylus based on an electromagnetic interaction generated between the magnetic field generated by the loop coils of the pen tablet and the stylus, when the stylus contacts or approaches the operation surface of the pen tablet.

Here, when the touch panel and the pen tablet are installed in a portable personal computer apparatus, considering the limited space and small size of the portable personal computer, respective position detecting mechanisms located under a common operation surface have been used to detect an input operation of both a finger of a user and a stylus.

Japanese Published Patent Application No. 9-1387730 describes a technology in which a detecting unit which serves as an electrostatic capacity type touch panel and a detecting unit which serves as an electromagnetic induction type pen tablet are disposed under a common operation surface.

However, when two operation input mechanisms (i.e., both detecting units) are located under the common operation surface, it becomes necessary to switch between the two operation input mechanisms. For example, when the display position of the pointer on the display screen of the personal computer apparatus is affected by these two operation input mechanisms, if it is detected that the electrostatic capacity type touch panel is also touched with the stylus when the personal computer apparatus is being operated by touching the operation surface with the stylus, then detected data from the two operation input mechanisms are both supplied to the personal computer apparatus. As a result, operation of the personal computer apparatus will be adversely affected. In particular, the pointer in the display screen may be moved erroneously.

For this reason, switch processing is used to select between the two operation input mechanisms. However, if the two operation input mechanisms are switched by using a manual switch, then operability will be reduced. Hence, the personal computer apparatus may include an automatic switching mechanism.

The Japanese Published Patent Application No. 9-1387730 describes switch processing in which, when the stylus approaches the operation surface within a certain distance, the electromagnetic induction type pen tablet is used with priority, and, in the meantime, the electrostatic capacity type touch panel is de-energized. However, this switch processing described in the Japanese Published Patent Application No. 9-1387730 describes is not able to switch the two operation input mechanisms satisfactorily.

More specifically, the switch processing described in the Japanese Published Patent Application No. 9-1387730 requires that a user should operate the stylus in constant contact with the operation surface.

However, some pen tablets can be operated in a state in which a tip of the stylus is not directly in contact with the operation surface, but instead the stylus and/or tip of the stylus is close or approaching the operation surface.

If the pen tablet can be operated by moving the tip of the stylus close to the operation surface, then a detection operation of the pen tablet to detect the approach of the tip of the stylus is used in both a switching operation and an input operation. Thus, when the pen tablet is operated with the stylus which is not in contact with the operation surface but is close to the operation surface, there is a possibility that the electromagnetic induction type pen tablet and the electrostatic capacity type touch panel will be switched unintentionally. This unintentional switching is problematic.

Also, when a display panel and the operation input device described above are formed as one body so that the personal computer apparatus may be operated by touching a display surface with a finger or stylus, operability of the personal computer apparatus can be improved. However, if the touch panel type operation input device described above and the pen tablet type operation input device described above are attached to the same display panel, then a problem arises in that switch processing to switch the above two operation input devices is required.

While a problem arising when the electrostatic capacity type touch panel and the electromagnetic induction type pen tablet are located at the same position has been described above, a similar problem also arises when two types of detecting units with other types of operation input mechanisms are disposed at the same place. Accordingly, there is a need for improved switch processing used to switch between input mechanisms.

SUMMARY OF THE INVENTION

The present invention provides an information processing apparatus, an operation input method, and a sensing device in which two types of operation detecting mechanisms can be switched and operated satisfactorily when the two types of operation detecting mechanisms are disposed near a display surface such that the information processing apparatus may be operated by touching the display surface.

An information processing apparatus includes an operation surface and a first sense unit for detecting whether the operation surface is directly touched. The information processing apparatus further includes a second sense unit for detecting whether a position pointing device approaches or contacts the operation surface based on an electromagnetic interaction generated between the second sense unit and the position pointing device. The information processing apparatus further includes an approach detecting unit for detecting whether the position pointing device is inside of a first detection range from the operation surface and whether the position pointing device is inside of a second detection range based on an output from the second sense unit. The first detection range extends further from the operation surface than the second detection range. The information processing apparatus further includes a display control unit for disabling display processing based on a detected output from the first sense unit and for enabling display processing based on a detected output from the second sense unit if the approach detecting unit determines that the position pointing device is inside of the second detection range.

An information processing apparatus is provided. The information processing apparatus includes a first sense unit for electrically detecting whether an operation surface is directly touched, a second sense unit for detecting whether a position pointing device approaches or contacts the operation surface based on an electromagnetic interaction generated between the second sense unit and the position pointing device, and an approach detecting unit for detecting whether the position pointing device is inside of a first detection range from the operation surface and whether the position pointing device is inside of a second detection range based on an output from the second sense unit. The first detection range extends further from the operation surface than the second detection range. The information processing apparatus further includes a display control unit for enabling display processing to be performed based on a detection output from the first sense unit if the approach detecting unit determines that the position pointing device is not inside of the first detection range, for disabling display processing based on the detection output from the first sense unit if it is determined that the position pointing device is inside of the first detection range from the operation surface, and for enabling display processing to be performed based on a detection output from the second sense unit if it is determined that the position pointing device lies within the second detection range.

An operation input method for accepting an input at an operation surface of an information processing apparatus is also provided. The method includes first detection processing for electrically detecting whether the operation surface is directly touched, second detection processing for detecting whether a position pointing device approaches or contacts the operation surface based on an electromagnetic interaction with the position pointing device, approach detection processing for detecting whether the position pointing device approaches within a first detection range from the operation surface and whether the position pointing device approaches within a second detection range based on an output from the second detection processing. Here, the first detection range extends further from the operation surface than the first detection range. The method further includes display control processing for disabling display processing based on a detection output from the first detection processing if the approach detection processing determines that the position pointing device approaches the second detection range, and enabling display processing based on a detection output from the second detection processing if the approach detection processing determines that the position pointing device approaches within the second detection range.

An operation input method for accepting an input at an operation surface of an information processing apparatus is also provided. The operation input method includes first detection processing for detecting whether the operation surface is directly touched, second detection processing for detecting whether a position pointing device approaches or contacts the operation surface based on an electromagnetic interaction with the position pointing device. The method further includes display control processing for enabling display processing based on a detected output of the first detection processing to be performed if the second detection processing determines that the position pointing device does not approach within a first detection range from the operation surface, for disabling display processing based on the detected output of the first detection processing if it is determined that the position pointing device approaches within the first detection range from the operation surface, and for enabling display processing based on a detected output of the second detection processing to be performed if it is determined that the position pointing device is within a second detection range which is closer to the operation surface than the first detection range.

A sensing device located under an operation surface of an information processing apparatus is also provided. The sensing device includes a first sense unit for electrically detecting whether the operation surface is directly touched, and a second sense unit for detecting whether a position pointing device approaches or contacts the operation surface based on an electromagnetic interaction generated between the second sense unit and the position pointing device. It is determined whether the position pointing device approaches within a first detection range from the operation surface and whether the position pointing device approaches within a second detection range based on an output from the second sense unit and processing based on an output from one of the first sense unit and the second sense unit is selected based on a position of the position pointing device with reference to the first and second detection ranges. The second detection range is closer to the operation surface than the first detection range.

An information processing apparatus having a display device with a display surface operable as an operation surface is also provided. The information processing apparatus includes a first sense unit disposed on a display surface of the display device to electrically detect whether the display surface is directly touched, a second sense unit disposed at a back side of the display device to detect whether a position pointing device approaches or contacts the display surface based on an electromagnetic interaction generated between the second sense unit and the position pointing device, an approach detecting unit for detecting whether the position pointing device approaches within a first detection range from the display surface and whether the position pointing device approaches a second detection range based on the output from the second sense unit. The second detection range is closer to the display surface than the first detection range. The information processing apparatus further includes a display control unit for disabling display processing at the display device based on an output from the first sense unit and for enabling the display device to perform display processing based on an output from the second sense unit if it is determined by the approach detecting unit that the position pointing device approaches within the second detection range.

An information processing apparatus having a display device with a display surface operable as an operation surface is also provided. The information processing apparatus includes a sense unit formed on a transparent substrate and having a first sensor electrode disposed on the display surface of the display device to electrically detect whether the display surface is directly touched and a second sensor electrode to detect whether a position pointing device approaches or contacts the display surface based on an electromagnetic interaction generated between the second sensor electrode and the position pointing device, and an approach detecting unit for detecting whether the position pointing device approaches within a first detection range from the display surface and whether the position pointing device approaches within a second detection range based on an output from the second sensor electrode. The second detection range is closer to the display surface than the first detection range. The information processing apparatus further includes a display control unit for disabling display processing at the display device based on an output from the first sensor electrode and enabling the display device to perform display processing based on an output from the second sensor electrode if the approach detecting unit determines that the position pointing device is within the second detection range.

An operation input method of accepting an input for an information processing apparatus having a display device with a display surface operable as an operation surface is also provided. The method includes first detection processing for electrically detecting whether the operation surface is directly touched, second detection processing for detecting whether a position pointing device approaches or contacts the operation surface based on an electromagnetic interaction generated the position pointing device, approach detection processing for detecting whether the position pointing device approaches a first detection range from the operation surface and whether the position pointing device approaches a second detection range based on an output from the second detection processing. The second detection range is closer to the operation surface than the first detection range. The method further includes display control processing for disabling display processing based on an output from the first detection processing and for enabling display processing to be performed based on an output from the second detection processing if the approach detection processing determines that the position pointing device approaches within the second detection range.

A sensing device for detecting approach or contact on a display surface of a display device is also provided. The sensing device includes a first sense unit for electrically detecting whether the display surface is directly touched, and a second sense unit for detecting whether a position pointing device approaches or contacts the display surface based on an electromagnetic interaction generated between the second sense unit and the position pointing device. Based on an output from the second sense unit, it is detected whether the position pointing device approaches within a first detection range from the display surface and whether the position pointing device approaches a second detection range. The second detection range is closer to the display surface than the first detection range. Processing based on an output from one of the first sense unit and the second sense unit is selected based on a position of the position pointing device with reference to the first and second detection ranges.

A sensing device usable with an information processing apparatus is also provided. The sensing device includes an operation surface having a predefined first detection region and a predefined second detection region disposed thereabove, and a sensing unit having a plurality of detection mechanisms to sense a position of a position pointing device with reference to the first and second detection regions and to selectively operate the detection mechanisms based on the sensed position of the position pointing device with reference to the first and second detection regions.

A method of controlling a sensing device having at least two detecting mechanisms disposed below an operation surface in an information processing apparatus is also provided. The method includes detecting a distance of a pointing device from the operation surface using a first detection mechanism with reference to first and second detection regions above the operation surface, and, if the position pointing device is in the first detection region, preparing the first detection mechanism to determine a coordinate position of the position pointing device with respect to the operation surface. If the position pointing device is in the second detection region, enabling the first detection mechanism to determine the coordinate position of the position pointing device with respect to the operation surface and enabling processing the determined coordinate position. If the position pointing device is in neither of the first and second detection regions, enabling a second detection mechanism to determine a coordinate position of contact on the operation surface and enabling processing of the determined coordinate position of the contact.

According to embodiments of the present invention, two types of detections are used to detect whether a position pointing device lies within a first detection range from an operation surface or display surface and to detect whether the position pointing device lies within a second detection range which is closer to the operation surface or display surface than the first range to detect a range in which the position pointing device is approaching the operation surface or display surface. Accordingly, a first sense unit and a second sense unit can be switched and operations based on detections of the respective sense units can be accepted and processed reliably.

In this case, an area of the first sense unit may be substantially equal to an area of the operation surface or display surface, and an area of the second sense unit is wider than the area of the first sense unit. As a result, the first and second detection ranges of the second sense unit are wider than the first sense unit. Accordingly, an input operation to directly touch the operation surface or display surface and an input operation to move the position pointing device close to the operation surface or display surface can be reliably performed. In particular, it becomes possible to detect the position pointing device as it approaches the operation surface or display surface even when the position pointing device is located at a position distant from an edge of a display surface.

Also, when the position pointing device is moved outside of the second detection range from when the position pointing device is located within the second detection range, and if the first sense unit determines that the operation surface or display surface is touched, then display processing based on the detected output from the first sense unit can be continuously disabled. If it is detected that the first sense unit detects that the operation surface or display surface is not being touched, then display processing based on the detected output from the first sense unit can be performed. For example, when the information processing apparatus is operated with the position pointing device, even if the operation surface or display surface is touched with a finger, an input operation based on the detected output from the first sense unit may not be resumed so long as the finger remains in contact with the operation surface or display surface temporarily.

BRIEF DESCRIPTION OF THE DRAWINGS

These and/or other aspects of the present invention will become apparent and more readily appreciated from the following description of the embodiments, taken in conjunction with the accompanying drawings of which:

FIG. 5 is a schematic block diagram illustrating an electromagnetic position detecting unit according to an embodiment of the present invention;

DESCRIPTION OF THE PREFERRED EMBODIMENT(S)

Figure 1:
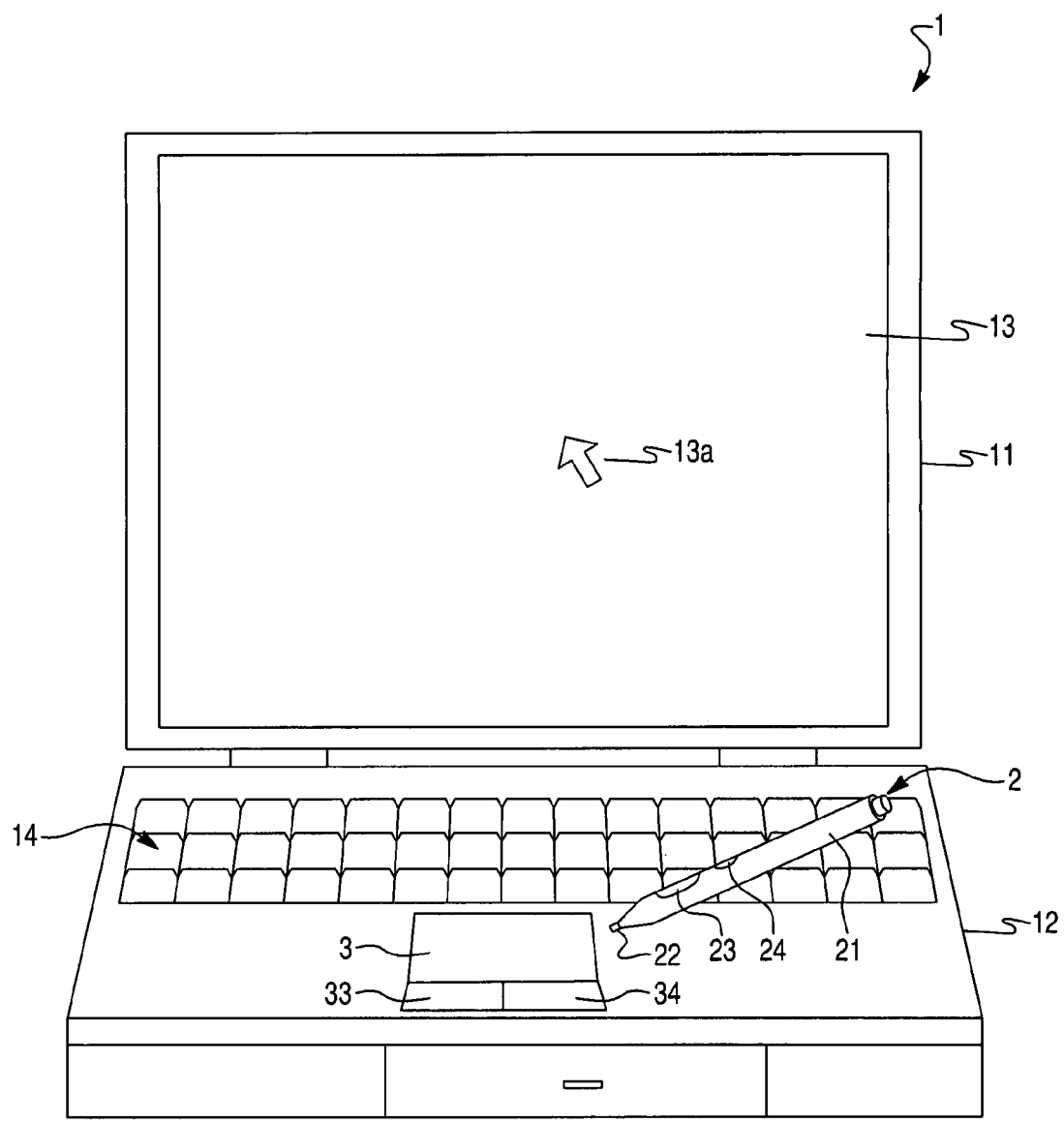
FIG. 1 is an perspective view illustrating a computer apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures. FIG. 1 illustrates a computer apparatus 1 according to an embodiment of the present invention. The computer apparatus 1 in FIG. 1 may be a notebook-sized computer apparatus including an upper casing or housing 11 and a lower casing or housing 12 that can be folded in the same manner as a flip-type mobile phone.

The upper casing 11 has a display 13 formed of a liquid-crystal display (LCD) panel provided thereon. The display 13 includes a movable pointer 13a which may be controlled using various input devices.

The lower casing 12 includes a key input unit 14 having various keys that are operable by a user, a position detecting unit 3, and switches 33 and 34.

The key input unit 14 includes various function keys such as number keys, character keys, and symbol keys. The key input unit 14 is adapted to detect depression operations of the keys.

The position detecting unit 3 detects a contact position (e.g., absolute position or relative position) at which a user touches the position detecting unit 3 with a finger. An upper surface of the position detecting unit 3 is formed of a flat surface which may be substantially flush with an upper surface of the lower casing 12. Alternatively, the upper surface of the position detecting unit 3 may be a flat surface slightly recessed with respect to the upper surface of the lower casing 12. The upper surface of the position detecting unit 3 serves as an operation surface which can accept position input operations performed by a user's finger or other objects.

Also, the position detecting unit 3 is able to detect position input operations performed not only by a user's finger but also a position pointing device 2.

As best shown in FIG. 1, the position pointing device 2 includes a pen-like casing or housing 21 and a pen-point 22 projecting from an end, i.e., a tip end, of the casing 21. Switches 23 and 24, which may be depressed by a user's finger, are arrayed on a side surface of the casing 21. When the position pointing device 2 is in use, a user may hold the position pointing device 2 in the same manner in which an ink pen is held. The user holding the position pointing device 2 may press the pen-point 22 against the operation surface of the position detecting unit 3.

When operated by a user, the position pointing device 2 is able to transmit a wireless signal to the position detecting unit 3 due to functions of a resonance circuit 26 and an IC (integrated circuit) 25 which will be described below with reference to FIG. 5. The position detecting unit 3 is able to detect a position pointed to or indicated by the position pointing device 2 by receiving the wireless signal (i.e., a position pointing signal) transmitted from the position pointing device 2.

Also, using the functions of the IC 25 and the resonance circuit 26, the position pointing device 2 can detect a pushing force (stylus pressure) applied to the pen-point 22 of the stylus when the position pointing device 2 is operated, can generate a signal indicative of the stylus pressure level and transmit the generated signal to the position detecting unit 3 together with the position pointing signal.

Further, using the functions of the IC 25 and the resonance circuit 26, the position pointing device 2 can detect operational states of the switches 23 and 24, can generate a signal indicative of the operational states of the switches 23 and 24 and transmit this signal to the position detecting unit 3 together with the position pointing signal.

When receiving the position pointing signal transmitted from the position pointing device 2, the position detecting unit 3 detects the position pointed to by the position pointing device 2. The position detecting unit 3 also detects the stylus pressure applied to the pen-point 22 of the position pointing device 2 and the operational states of the switches 23 and 24.

Switches 33 and 34 are adjacent to the position detecting unit 3 and are provided on the upper surface of the lower casing 12. The switches 33 and 34 are activated when depressed and can be operated in combination with the position detecting unit 3.

Here, the operational surface of the position detecting unit 3 may be substantially rectangular and have an imaginary X-Y orthogonal coordinates system set for reference. A longer side may be assumed to correspond to an X direction and a shorter side may be assumed to correspond to a Y direction. The position detecting unit 3 may detect a position touched with a user's finger and the position pointed to by the position pointing device 2 as an absolute position or a relative position in the X-Y orthogonal coordinates system.

The computer apparatus 1 of FIG. 1 is able to perform various functions by executing various application programs in accordance with instructions input by operating the key input unit 14, the position detecting unit 3, and the switches 33 and 34. When the application programs are executed, various display screens relating to data being processed are displayed on the display 13.

When a position pointing (input) operation is detected by the position detecting unit 3, a position of the pointer 13a displayed on the display 13 is controlled/changed in response to the detected position. The change of the displayed position is performed based on control of a CPU (central processing unit) 41 (see FIG. 3) which will be described below.

Figure 2B:
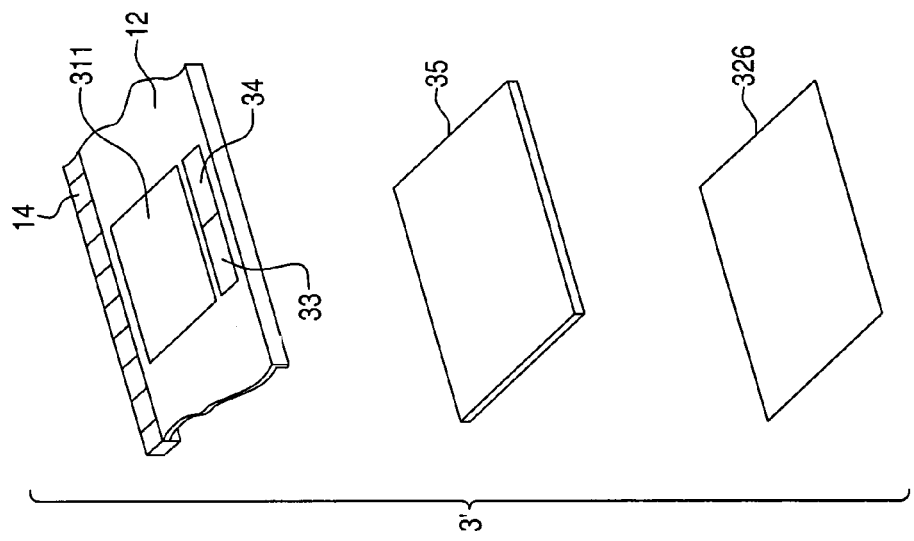
FIGS. 2A and 2B are exploded assembly views illustrating a position detecting unit of the computer apparatus of FIG. 1 according to an embodiment of the present invention.
Figure 2A:
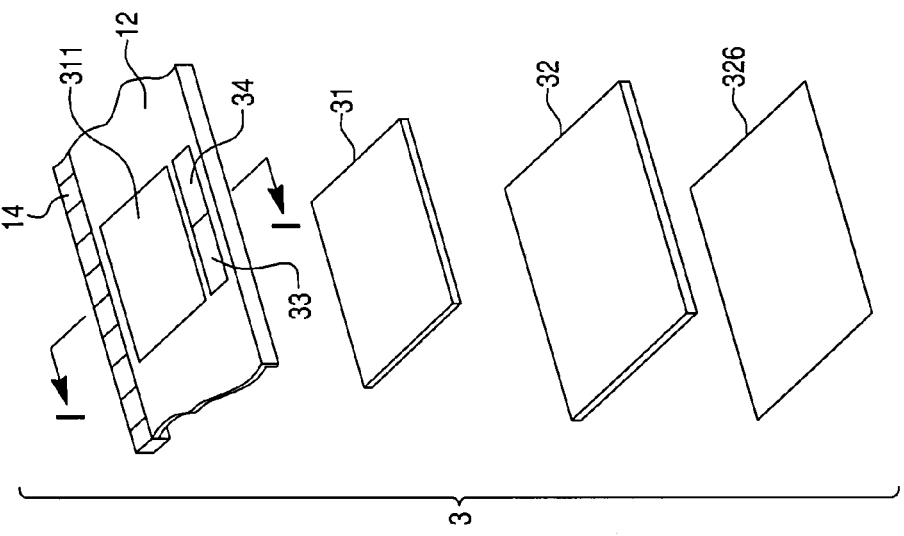

FIGS. 2A and 2B are exploded perspective views illustrating the position detecting unit 3 of the computer apparatus 1. FIG. 2A illustrates an arrangement in which a plurality of sense units are separate from each other, and FIG. 2B illustrates an arrangement in which a plurality of sense units are integrated with each other.

As illustrated in FIG. 2A, a first sense unit 31 is located on a lower side of a surface protecting layer 311 which serves as the operation surface disposed on the surface of the lower casing 12. The first sense unit 31 may detect whether the surface protecting layer 311 is directly touched or contacted with a user's finger or the like. The first sense unit 31 may be used to indicate a relative position.

A second sense unit 32 is located under the first sense unit 31. The second sense unit 31 may detect operations performed by the position pointing device 2 (see FIG. 1). The second sense unit 32 may be used to indicate an absolute position.

Further, a shield plate 326 is located under the second sense unit 32. It should be noted that an auxiliary conductor plate (not shown) that can function as a ground electric potential unit of the first sense unit 31 may be disposed between the first and second sense units 31 and 32.

The first sense unit 31 may have substantially the same area as that of the surface protecting layer 311. The second sense unit 32 and the shield plate 326 may have areas that are larger than that of the first sense unit 31 in order to extend a detection range along a peripheral portion of the surface protecting layer 311.

FIG. 2B illustrates an arrangement in which a plurality of sense units are integrated with each other as one body. In this case, a composite sense unit 35 is located on the lower side of the surface protecting layer 311 as a position detecting unit 3'. This composite sense unit 35 is formed by integrating the first sense unit 31 and the second sense unit 32 illustrated in FIG. 2A as one body.

In this integrated arrangement, an electrode of the first sense unit 31 (see FIG. 2A), for example, and a loop coil of the second sense unit 32 (see FIG. 2A) may be alternately located in the same plane. The shield plate 326 is located under the composite sense unit 35.

It should be noted that, when the first sense unit 31 and the second sense unit 32 are combined as illustrated in FIG. 2A, the first and second sense units 31 and 32 can be constructed as an integrated sensing device. Also, the sensing device may incorporate therein circuit components operable as an electrostatic capacitance position detecting unit 50 (see FIG. 3) and an electromagnetic position detecting unit 60 (see FIG. 3) which will be described below. Further, the sensing device may incorporate therein a component that functions as an input unit 45 (see FIG. 3) which will be described below.

Figure 3:
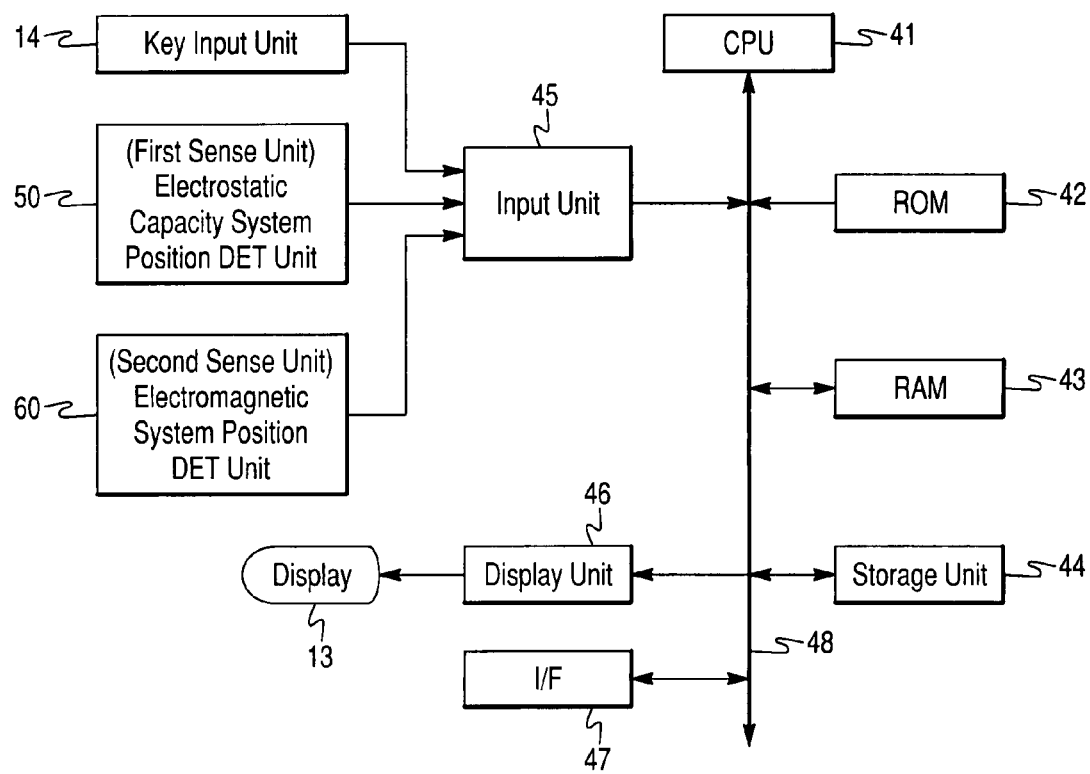
FIG. 3 is a functional block diagram illustrating a computer apparatus according to an embodiment of the present invention.

FIG. 3 is a functional block diagram illustrating the computer apparatus 1.

As illustrated in FIG. 3, the computer apparatus 1 includes the CPU (central processing unit) 41 for controlling respective units of the computer apparatus 1 by executing various control programs, a ROM (read-only memory) 42 for storing control programs executed by the CPU 41, a RAM (random-access memory) 43 which serves as a work area to temporarily store programs and data processed by the CPU 41, and a storage unit 44 for storing control programs, application programs executed by the CPU 41 and data relating to the application programs.

The computer apparatus 1 includes the key input unit 14 and the input unit 45. The input unit 45 is connected to the electrostatic capacity position detecting unit 50 to detect a position of a user's finger in the position detecting unit 3 and the electromagnetic position detecting unit 60 to detect a position input operation performed by the position pointing device 2 in the position detecting unit 3.

The electrostatic capacitance position detecting unit 50 detects a touch of a user's finger using the first sense unit 31 of the position detecting unit 3 and generates an operation signal indicative of the detected position. The electrostatic capacitance position detecting unit 50 may then output this operation signal to the input unit 45.

Also, the electromagnetic position detecting unit 60 detects a position input operation performed by the position pointing device 2 using the second sense unit 32 of the position detecting unit 3 and generates operation signals indicative of a detected position, the stylus pressure in the position pointing device 2, and the operational states of the switches 23 and 24. The electromagnetic position detecting unit 60 may then output the operation signals to the input unit 45.

It should be noted that when the position input operation of the position pointing device 2 is detected using the second sense unit 32, a state in which the end (that is, pen-point 22) of the position pointing device 2 touches the surface protecting layer 311 may be detected and a state in which the end of the position pointing device 2 is moved close to the surface protecting layer 311 may also be detected. When the end of the position pointing device 2 is moved close to the surface protecting layer 311, a control circuit 601 (see FIG. 5) of the electromagnetic position detecting unit 60 is able to determine a rough distance between the end of the position pointing device 2 and the surface protecting layer 311.

By detecting the rough distance as described above, the input unit 45 is able to perform processing operations to accept any input operation when the input operation of either of the electrostatic capacity detecting unit 50 and the electromagnetic detecting unit 60 are possible at the same time. This processing will be described in detail below.

It should be understood that embodiments of the present invention are not intended to be limited to the arrangement in which the control circuit 601 of the electromagnetic position detecting unit 60 performs approach detecting processing for detecting a distance in which the end of the position pointing device 2 is moved close to the surface protecting layer 311. The CPU 41 of the computer apparatus 1 may alternatively function as an approach detecting unit by detecting when the end of the position pointing device 2 is moved close to the surface protecting layer 311.

The input unit 45 generates operation information corresponding to keys in the key input unit 14 that are operated by a user. Also, the input unit 45 generates operation information indicative of a detection operation performed by the electrostatic capacitance position detecting unit 50 and the electromagnetic position detecting unit 60 based on the operation signals provided by these detection units 50 and 60. The CPU 41 is able to execute various operations by acquiring the operation information generated by the input unit 45.

Further, the computer apparatus 1 includes a display unit 46 to drive the display 13 based on screen display data input from the CPU 41 to display various screens on the display 13. The computer apparatus 1 further includes an interface (I/F) 47 connected to various e components outside of the computer apparatus 1 to transmit and receive information between these components. The CPU 41, the ROM 42, the RAM 43, the storage unit 44, the input unit 45, the display unit 46, and the I/F 47 are connected to one another via a bus 48.

The CPU 41 may control units of the computer apparatus 1 by executing a control program stored in the ROM 42. The CPU 41 may also read an application program from the storage unit 44 and execute the application program in the work area provided by the RAM 43 to process various data.

During execution of the control program and the application program, the CPU 41 may generate the screen display data for display screens relating to the programs being executed and output the same to the display unit 46. Accordingly, the display screens can be displayed on the display 13.

Also, when the operation information which corresponds to the position input operation performed by a user's finger or the position input operation performed by the position pointing device 2 is provided to the CPU 41 by the input unit 45, the CPU 41 may determine (or discriminate among) content being pointed to or indicated based on the operation information and the screen display data of the display screen being output to the display unit 46. In this manner, the CPU 41 may execute functions and processing operations based on the content which is being pointed to or indicated by the position input operation.

Figure 4:
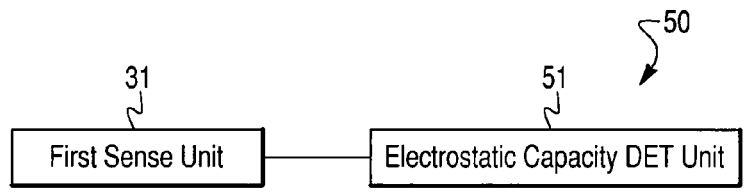
FIG. 4 is a block diagram illustrating an electrostatic capacity position detecting unit according to another embodiment of the present invention.

FIG. 4 is a functional block diagram illustrating the electrostatic capacitance position detecting unit 50. As illustrated in FIG. 4, the electrostatic capacitance position detecting unit 50 includes the first sense unit 31 of the position detecting unit 3 and an electrostatic capacitance detecting unit (circuit) 51 connected to electrodes of the first sense unit 31.

The electrostatic capacitance detecting circuit 51 applies a predetermined voltage to each of a plurality of electrodes in the first sense unit 31 such that a predetermined electrostatic capacitance is generated between opposing electrodes. When a user's finger touches the operation surface of the position detecting unit 3, the electrostatic capacitance between the opposing electrodes is changed. Based on the change in electrostatic capacitance, the electrostatic capacitance detecting circuit 51 may specify the electrodes having the respective electrostatic capacitancey changed considerably. Accordingly, the position at which a user' finger touches the operation surface of the position detecting unit 3 may be obtained by executing calculations based on the corresponding position and a degree to which the electrostatic capacitance is changed. The electrostatic capacitance detecting circuit 51 may also calculate corresponding coordinates (e.g., absolute position coordinates or relative position coordinates). Further, the electrostatic capacitance detecting circuit 51 generates an operation signal indicative of the calculated coordinates and outputs the operation signal to the input unit 45 (see FIG. 3).

FIG. 5 is a schematic block diagram illustrating the electromagnetic position detecting unit 60. As illustrated in FIG. 5, the electromagnetic position detecting unit 60 includes first loop coils 322 and second loop coils 324 of the position detecting unit 3 connected to an electromagnetic detecting circuit (unit) 600.

It should be noted that the position pointing device 2 is also shown in FIG. 5 together with the electromagnetic position detecting unit 60 in order to describe the present invention more clearly.

The position detecting device 2 includes the resonance circuit 26 having a coil (not shown) and a capacitor (not shown), and the IC (integrated circuit) 25 connected to the resonance circuit 26.

The electromagnetic detecting circuit 600 includes a selecting circuit 602 to select a loop coil from among the plurality of loop coils 322 and 323 of the position detecting unit 3. The electromagnetic detecting circuit 600 further includes a transmission and reception switching circuit 603 to switch between a transmission mode to transmit a signal via the loop coil selected by the selecting circuit 602 and a reception mode to receive a signal from the position pointing device 2 via the loop coil selected by the selecting circuit 602.

The electromagnetic detecting circuit 600 further includes a control circuit 601 to control units/components of the electromagnetic detecting unit 600, an amplifying circuit 601 to amplify a signal output from the transmission and reception switching circuit (detector) 603, a BPF (bandpass filter) 605 to pass only a signal component of a predetermined frequency band with respect to the signal amplified by the amplifying circuit 604, a detecting circuit 606 to convert the signal component passed through the BPF 605 into a voltage value, a sample-and-hold (S/H) circuit 607 to hold this voltage value during a predetermined time period, an A/D (analog-to-digital) converting circuit 608 to convert the voltage value held in the sample-and-hold circuit 607 into digital data and to output the digital data to the control circuit 601, a signal generating circuit 609 for generating an oscillation signal with a predetermined frequency based on control of the control circuit 601, and an amplifying circuit 610 to amplify the signal generated by the signal generating circuit 609 and to output the amplified signal to the transmission and reception switching circuit 603.

The manner in which the electromagnetic detecting circuit 600 detects a position input operation performed by the position pointing device 2 will now be described.

First, the control circuit 601 controls the selecting circuit 602 to select one loop coil and controls the transmission and reception switching circuit 603 to switch the operation mode to the transmission mode.

The control circuit 601 then controls the signal generating circuit 609 to generate a signal with a predetermined frequency. The signal is amplified by the amplifying circuit 610 and provided through the transmission and reception switching circuit 603 to the selecting circuit 602. Accordingly, an electric current corresponding to the amplified signal is provided to the loop coil selected by the selecting circuit 602. The electric current flows through the selected loop coil, and as a result, a magnetic field (alternating field) is generated around the selected loop coil.

Here, in the position pointing device 2, an induced electric current may flow to the resonance circuit 26 due to the magnetic field generated around the selected loop coil of the electromagnetic detecting circuit 600 to enable the IC 25 to begin operation. The IC 25 generates a signal with a predetermined frequency relative to the resonance circuit 26 and provides the generated signal to the resonance circuit 26 to be transmitted to the electromagnetic detecting circuit 600.

The control circuit 601 of the electromagnetic detecting circuit 600 switches the operation mode to the reception mode by controlling the transmission and reception switching circuit 603 after operating in the transmission mode for a predetermined time period. When the operation mode is switched to the reception mode as described above, the signal from the signal generating circuit 609 is no longer output to the selecting circuit 602.

In the reception mode, the signal transmitted from the position pointing device 2 due to operation of the IC 25 is received by the loop coil selected by the selecting circuit 602. More specifically, when the IC 25 is operated, the signal is applied to the resonance circuit 26 and an electric current corresponding to the signal generated by the IC 25 flows through the resonance circuit 26. As a result, a magnetic field is generated around the resonance circuit 26, which causes an induced electric current to flow through the loop coils 322 and 324.

The electric current flowing through the selected loop coil is amplified by the amplifying circuit 604 and only the signal component of the predetermined frequency band is output to the detecting circuit (detector) 606 by the BPF 605. The signal component in the passband of the BPF 605 is then converted into a voltage value by the detecting circuit 606 and held in the sample-and-hold (S/H) circuit 607. The voltage value held in the sample-and-hold circuit 607 is then converted into digital data by the A/D converting circuit 608 and output to the control circuit 601.

Then, while the loop coils 322 and 324 are sequentially being selected by the selecting circuit 602, the control circuit 601 may specify the loop coil closest to the position pointed to by the position pointing device 2 and may determine coordinates of the pointed position by processing the digital data input from the A/D converting circuit 608.

Also, while the electric current is flowing through the resonance circuit 26, the IC 25 in the position pointing device 2 detects the stylus pressure applied to the pen-point 22 (see FIG. 1) and the operational states of the switches 23 and 24 (see FIG. 1). Based on the stylus pressure and the operational states of the switches 23 and 24, the IC 25 may change transmission timing and transmission time of the oscillation signal provided to the resonance circuit 26. The changes in the transmission timing and the transmission time may subsequently be detected during the processing performed when the voltage value held in the sample-and-hold circuit 607 is converted into digital data by the A/D converting circuit 608.

Accordingly, the control circuit 601 in the electromagnetic detecting circuit 600 may acquire the stylus pressure and the operational states of the switches 23 and 24 by calculating or otherwise processing the digital data input from the A/D converting circuit 608.

The control circuit 601 then generates an operation signal indicative of the position pointed to by the position pointing device 2, the stylus pressure in the position pointing device 2, and the operational states of the switches 23 and 24 and outputs the operation signal to the input unit 45 (see FIG. 3).

It should be noted that while the pen-shaped position pointing device 2 includes the IC 25 in the arrangement illustrated in FIG. 5, the present invention is not intended to be limited to this type of arrangement. The pen-shaped position pointing device 2 may, in some embodiments, not include the IC 25.

The computer apparatus 1 includes the electrostatic capacitance position detecting unit 50 to detect the input operation performed by a user's finger and the electromagnetic position detecting unit 60 to detect the position input operation performed by the position pointing device 2. As a result, the computer apparatus 1 is able to individually detect an input operation on the operation surface of the position detecting unit 3 performed by a user's finger or the position pointing device 2. Consequently, it becomes possible for a user to perform input operations using a plurality of methods with different feels of operation, and operability can be improved.

Also, since the position detecting unit 3 is arranged such that the first sense unit 31, which detects an operation performed by a user's finger, and the second sense unit 32, which detects an operation performed by the position pointing device 2, are positioned upon one another in the lower casing 12 of the computer apparatus 1, the position detecting unit 3 can be easily applied to small and portable electronic devices having a casing (housing) size that is limited.

An input operation based on detection at the electrostatic capacitance detecting unit 50 and an input operation based on detection at the electromagnetic position detecting unit 60 are inhibited (disabled) from being performed at the same time, and the computer apparatus 1 may accept only one of the above input operations.

Operational states in which two detection operations are processed (e.g., contact detection at the first sense unit 31 and contact or close detection at the second sense unit 31) are executed selectively will now be described.

Figure 6A:
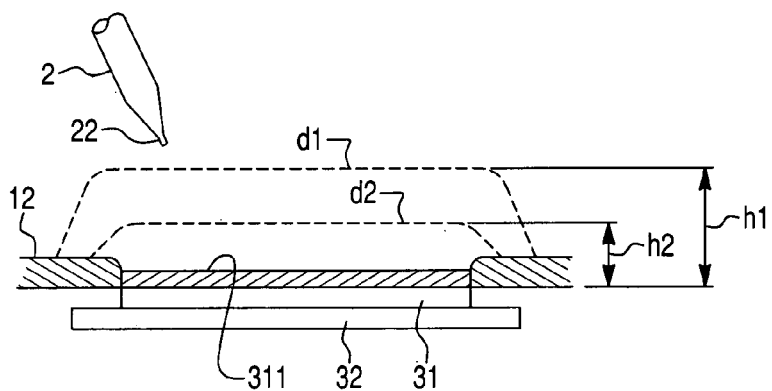
FIGS. 6A to 6D are fragmentary cross-sectional views taken along the line I-I in FIG. 2A and illustrate states in which a position pointing device is approaching the detection ranges.

FIGS. 6A to 6D are schematic cross-sectional views taken along the line I-I in FIG. 2A and illustrate states in which the position pointing device 2 is approaching detection ranges of the position detecting unit 3. As shown in FIG. 6A, the first and second sense units 31 and 32 are located at the lower portion of the surface protecting layer 311.

The first sense unit 31 is adapted to detect whether the surface protecting layer 311 is directly touched with a user's finger. The second sense unit 32 is adapted to detect whether the end 22 of the position pointing device 2 approaches or contacts the surface protecting layer 311.

In order to detect whether the end 22 of the position pointing device 2 approaches the surface protecting layer 311, as shown in FIG. 6A, a first detection range d1 is defined by when the end 22 is less than a first height h1 from the surface protecting layer 311, and a second detection range d2 is defined by when the end 22 approaches the surface protecting layer 311 and is less than a second height h2 from the surface protecting layer 311. As illustrated in FIG. 6A, the second height h2 is less than the first height h1.

The control circuit 601 (see FIG. 5) of the electromagnetic position detecting unit 60 is adapted to determine whether the end 22 of the position pointing device 2 lies within the first detection range d1 or the second detection range d2. The first height h1 may be about several centimeters, for example, and the second height h2 may be about 1 centimeter, for example.

In the present embodiment, the area of the second sense unit 32 may be larger than that of the first sense unit 31. Here, the first and second detection ranges d1 and d2 extend beyond a peripheral portion of the surface protecting layer 311.

FIGS. 6A to 6D illustrate the states in which the position of the end 22 of the position pointing device 2 is being changed. The control circuit 601 (see FIG. 5) is able to detect and discriminate among the four states illustrated in FIGS. 6A and 6D, respectively.

Figure 6B:
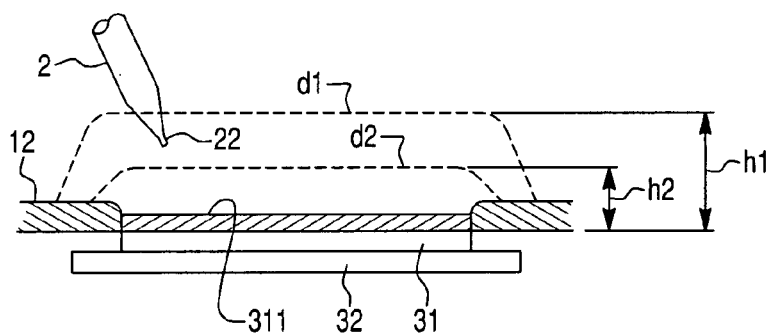
Figure 6C:
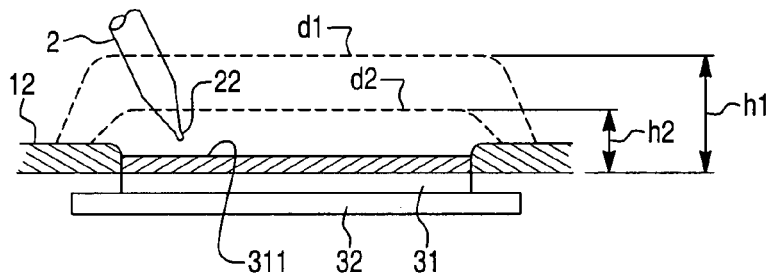
Figure 6D:
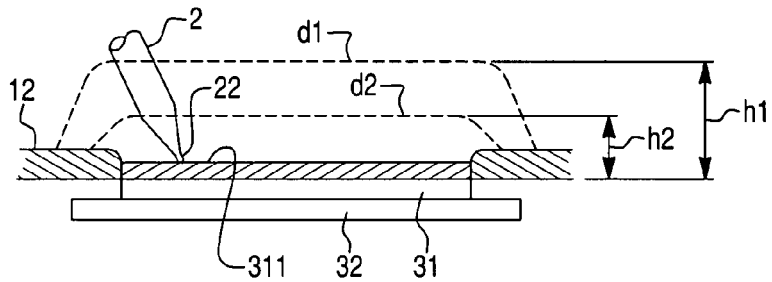

More specifically, FIG. 6A illustrates a state in which the end 22 of the position pointing device 2 lies outside the first detection range d1. FIG. 6B illustrates a state in which the end 22 of the position pointing device 2 lies within the first detection range d1 but outside the second detection range d2. FIG. 6C illustrates a state in which the end 22 of the position pointing device 2 lies within the second detection range d2. FIG. 6D illustrates a state in which the end 22 of the position pointing device 2 is in contact with the surface protecting layer 311.

It should be noted that when the end 22 of the position pointing device 2 is brought in contact with the surface protecting layer 311, pressure (i.e., the stylus pressure) with which the end 22 of the position pointing device 2 contacts the surface protecting layer 311 can be determined based on a signal from the position pointing device 2.

As illustrated in FIGS. 6A to 6D, since the area of the second sense unit 32 is larger than that of the first sense unit 31, the first and second detection ranges d1 and d2 extend slightly beyond the surface protecting layer 311 based on the differences in area. That is, the first detection range d1 has a greater width than the second detection area d2. Accordingly, when the position pointing device 2 approaches the surface protecting layer 311 from a lateral direction, it is possible to reliably detect the approach of the position pointing device 2 to the surface protecting layer 311.

Based on the various detection states, the control circuit 601 (see FIG. 5) issues an interrupt request to the input unit 45 of the computer apparatus 1. When certain conditions are satisfied, input processing based on an output from the electromagnetic position detecting unit 60 is executed with a priority over input processing based on an output from the electrostatic capacity position detecting unit 50.

Figure 7:
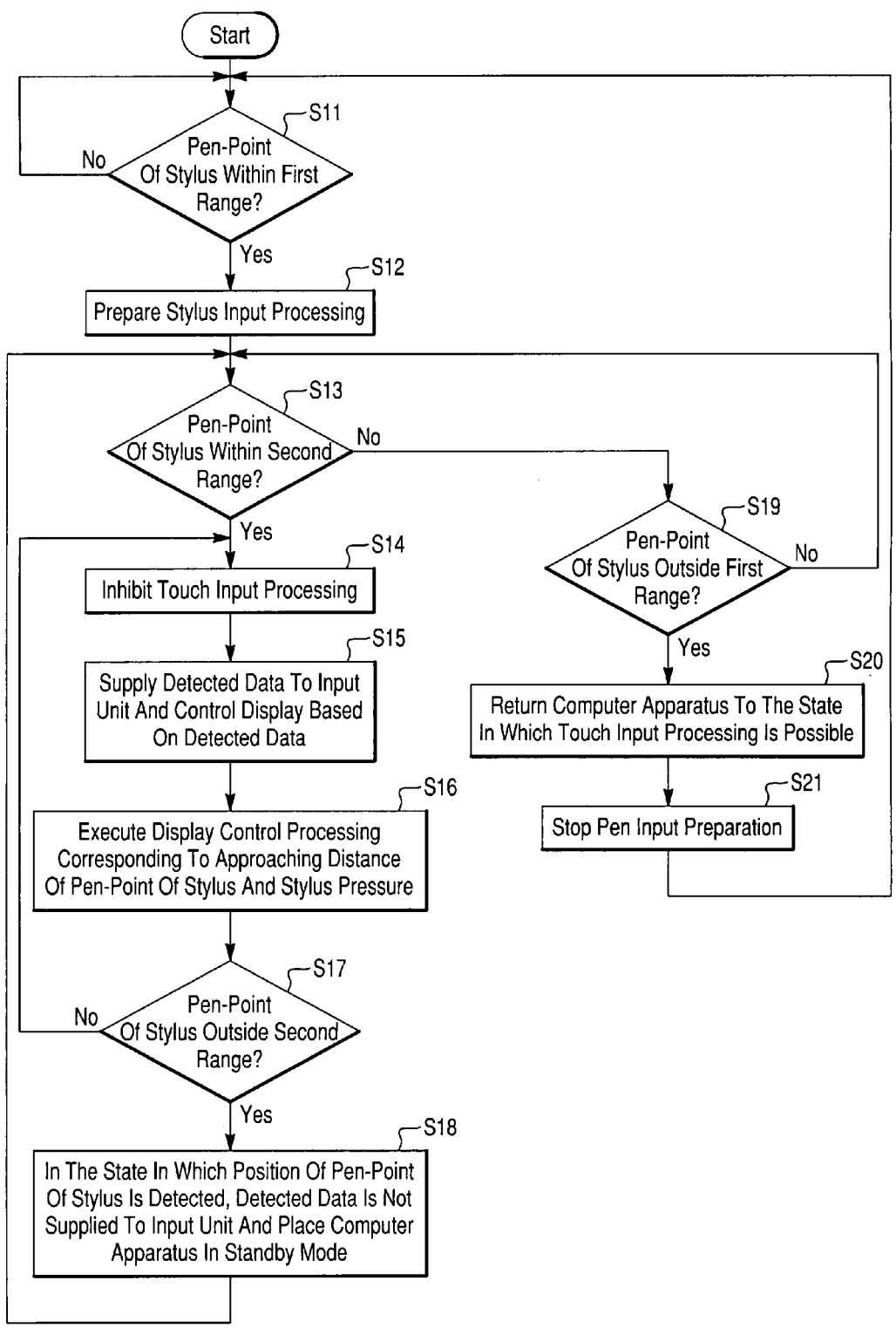
FIG. 7 is a flowchart illustrating a method of processing a detection operation according to an embodiment of the present invention.

FIG. 7 is a flowchart illustrating a method of processing a detection operation according to an exemplary embodiment of the present invention. The method of FIG. 7 may be performed by the computer apparatus 1 of FIG. 1 and/or the control circuit 601 of FIG. 5. The method of FIG. 7 is used to select input processing based on the outputs from the two detecting units 50 and 60.

It should be noted that in the description that follows, electrostatic capacitance contact detection in the first sense unit 31 will be referred to as a "touch input" and electromagnetic detection at the second sense unit 32 using the position pointing device 2 will be referred to as a "stylus input."

First, referring to FIG. 7, it is determined at step S11 whether the end 22 of the stylus 2 is inside of a first range (e.g., the first detection range d1) shown in FIGS. 6A to 6D. If the pen-point 22 of the stylus 2 is determined to be outside of the first detection range as represented by a "NO" at step S11, then the control circuit 601 of the electromagnetic position detection unit 60 is set to a standby state and an operator is able to perform a touch input. If the pen-point of the stylus is determined to be inside of the first detection range d1 as represented by a "YES" at step S11, then control goes to a step S12 and control circuit 601 of the electromagnetic position detecting unit 60 performs preparation processing and enters a state or mode in which stylus input processing can be performed. In this state, the control circuit 601 can quickly determine whether the pen-point 22 of the stylus 2 lies within the second detection range d2.

At step S13, it is determined whether the pen-point 22 of the stylus 2 is inside of the second detection range d2. If the pen-point 22 of the stylus 2 is inside of the second detection range d2 as represented by a "YES" at step S13, then step S14 is performed. At step S14, touch input processing is inhibited (i.e., disabled).

At step S15, stylus input processing detection data is supplied to the input unit 45 (see FIG. 3) and display control is executed based on the detection data. At step S16, display control is performed based on an approaching distance of the pen-point 22 and the stylus pressure. At step S17, it is then determined whether the pen-point has moved outside of the second detection range d2. If the pen-point 22 has not moved outside of the second detection range d2 (that is, the pen-point 22 still lies within the second detection range d2) as represented by a "NO" at step S17, then the steps S14 to S16 are repeated.

If on the other hand, the pen-point of the stylus 2 lies outside of the second detection range d2 as represented by a "YES" at step S17, then step S18 is performed. At step S18, the detection data of the stylus input is not supplied to the input unit 45 and the control circuit 601 of the electromagnetic position detecting unit 60 is set to the standby mode. Then, the method is continued at step S13.

If the pen-point 22 of the stylus 2 lies outside of the second detection range d2 as represented by a "NO" at step S13, then step S19 is performed. At step S19, it is determined whether the pen-point 22 of the stylus 2 lies outside the first detection range d1. If the pen-point 22 of the stylus 2 is not outside of the first detection range d1 as represented by a "NO" at step S19, then the method continues at step S13. If the pen-point 22 of the stylus 2 lies outside of the first detection range d1 as represented by a "YES" at step S19, then the method continues at step S20 in which the control circuit 601 is set to a state in which the touch input processing can be performed. At step S21, the stylus input preparation is stopped and the method continues at step S11.

Figure 8:
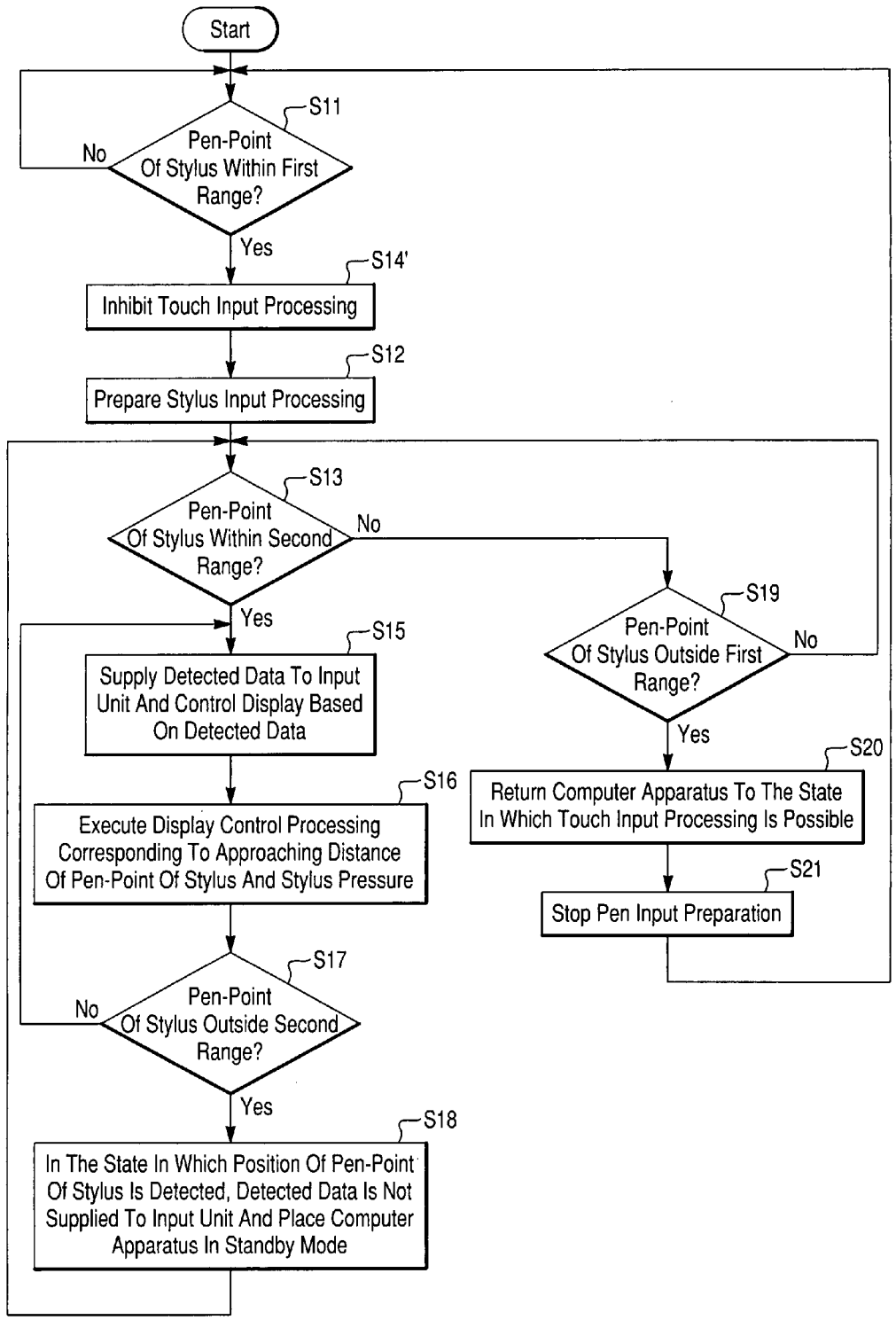
FIG. 8 is a flowchart illustrating a method of processing a detection operation according to an embodiment of the present invention.

A flowchart illustrated in FIG. 8 illustrates another exemplary method of selecting an input processing selection state based on the outputs from the two detecting units 50 and 60. In the flowchart of FIG. 8, some of the same steps as the flowchart of FIG. 7 are represented by the same reference numbers.

Referring to FIG. 8, it is determined at step S11 whether the pen-point 22 of the stylus 2 is inside of the first detection range d1. If the pen-point 22 of the stylus 2 is determined to be inside of the first detection range d1 as represented by a "YES" at the decision step S11, then step S14' is performed. At step S14', the touch processing is inhibited (disabled). Once the touch processing is inhibited, step S12 is performed, and the stylus input processing state is prepared.

Then, it is determined at step S13 whether the pen-point 22 of the stylus 2 is inside of the second detection range d2. If the pen-point 22 of the stylus 2 is inside of the second detection range d2 as represented by a "YES" at step S13, then step S15 is performed. At step S15, stylus input processing detection data is supplied to the input unit 45 and display control is executed based on the detection data. Then, step S16 is performed in which display control processing is executed according to the approaching distance of the pen-point 22 of the stylus 2 and the stylus pressure. The remaining steps of the method of FIG. 8 may be the same as the method of FIG. 7.

Next, examples of detailed processing performed at step S16 of the methods of FIGS. 7 and 8 will be described with reference to flowcharts shown in FIG. 9 and FIG. 10. The detailed processing of FIGS. 9 and 10 may be performed by the computer apparatus 1 of FIG. 1 or the control circuit 601 of FIG. 5.

Figure 9:
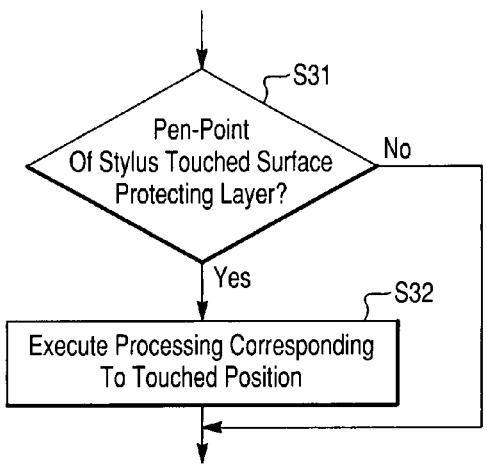
FIG. 9 is a flowchart illustrating a method of processing a detection operation when a stylus is approaching an operation surface according to an embodiment of the present invention.

Referring to FIG. 9, it is determined at step S31 whether the pen-point 22 of the stylus 2 touches the surface protecting layer 311. If the pen-point of the stylus 2 does not touch the surface protecting layer 311 as represented by a "NO" at step S31, then ordinary display processing is performed to change a display position of the pointer 13a (see FIG. 1) displayed on the screen in response to the detection position.

If the pen-point 22 of the stylus 2 touches the surface protecting layer 311 as represented by a "YES" at step S31, then step S32 is performed. At step S32, processing is performed according to a contact position (i.e., a touched position) to change the display position of the pointer 13a and also to select the pointed position (e.g., which may correspond to display data on the display 13) at the same time.

Figure 10:
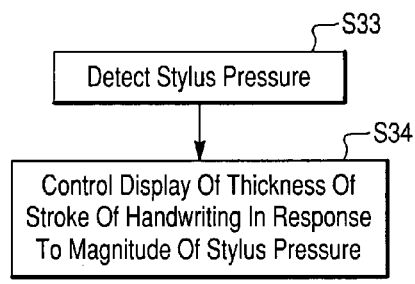
FIG. 10 is a flowchart illustrating a method of processing a detection operation when a stylus is approaching an operation surface according to an embodiment of the present invention.

Referring to FIG. 10, it is assumed that a mode is set in which a line is drawn in response to a change in the contact position at which the pen-point 22 of the stylus 2 touches the surface protecting layer 311. In this case, at step S33, the stylus pressure with which the pen-point 22 of the stylus 2 touches the surface protecting layer 311 is detected. Then, step S34 is performed in which a width of the line drawn on the display screen is changed in response to a change in the detected stylus pressure. That is, if the stylus pressure is small, then a handwritten trace corresponding to the change of stylus position is displayed by a thin trace width. If the stylus pressure is large, then the handwritten trace corresponding to the change of the stylus position is displayed by a thick trace width.

Next, processing performed when a touch input is being detected will be described with reference to the flowchart of FIG. 11, and processing performed when the stylus input is being detected will be described with reference to the flowchart of FIG. 12.

Figure 11:
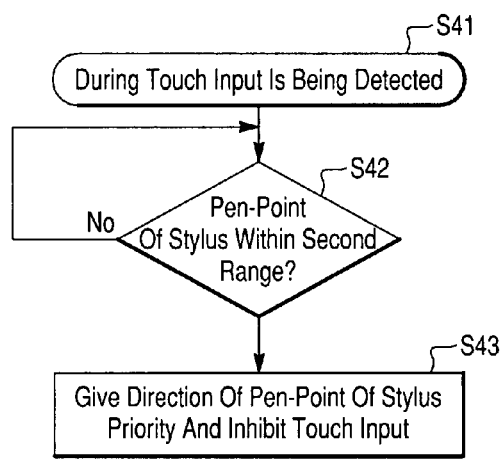
FIG. 11 is a flowchart illustrating a method of processing a detection operation when a touch input is being detected by an electrostatic capacity position detecting unit according to an embodiment of the present invention.

Referring to FIG. 11, a touch input is detected at step S41. Then, at step S42, it is determined whether the pen-point 22 of the stylus 2 is inside of the second detection range d2. If the pen-point of the stylus 2 is determined to be inside of the second detection range, as represented by a "YES" at step S42, then step S43 is performed. In step S43, processing based on detection of pen-point position of the stylus 2 is performed with priority and processing based on touch input is inhibited (disabled).

Figure 12:
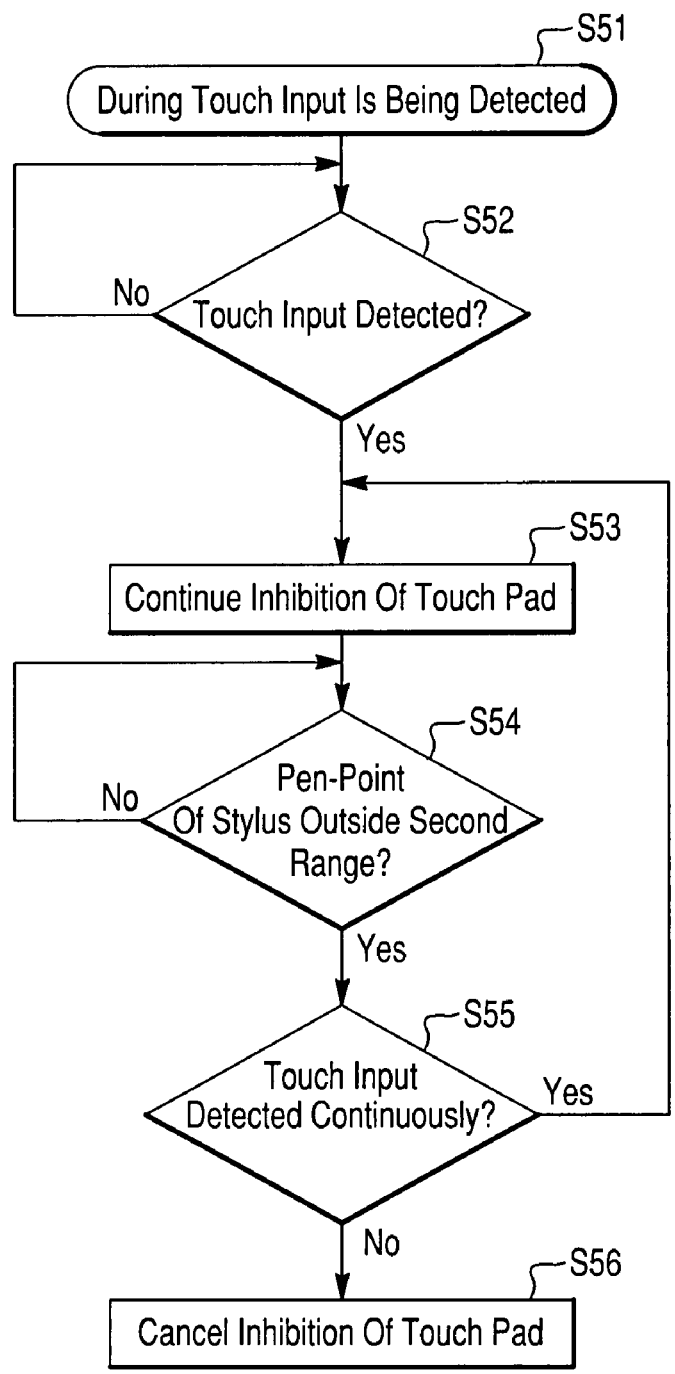
FIG. 12 is a flowchart illustrating a method of processing a detection operation when a stylus input is being detected by an electromagnetic position detecting unit according to an embodiment of the present invention.

Referring to FIG. 12, the pen-point 22 of the stylus 2 is detected within the second detection range d2 and display control processing based on the stylus input is performed at step S51. At step S52, it is determined whether the pen-point 22 of the stylus 2 touches the surface protecting layer 311. If a touch input is detected, as represented by a "YES" at step S52, then step S53 is performed. In step S53, inhibition of touch input is continued.

Then, step S54 is performed. Here, it is determined whether the pen-point 22 of the stylus 2 has moved outside of the second detection range d2. If the pen-point 22 of the stylus 2 is determined not to be outside of the second detection range d2 (that is, the pen-point 22 of the stylus 2 lies within the second detection range d2) as represented by a "NO" at step S54, then inhibition of the touch input is continued and the control circuit 601 is set to operate in the standby mode. If on the other hand, the pen-point of the stylus has moved outside of the second range, as represented by a "YES" at step S54, then step S55 is performed. It is determined at step S55 whether a touch input is being detected continuously.

If the touch input is being detected continuously as represented by a "YES" at step S55, then the method is continued at step S53, where inhibition of the touch input is continued, regardless of a change in position of the pen-point 22 of the stylus 2. If on the other hand, the touch input is not detected continuously as represented by a "NO" at step S55, then step S56 is performed. In step S56, inhibition of the touch input is cancelled. If the touch input is subsequently detected, then the control circuit 601 is set to operate in a state which accepts a touch input.

According to the processing illustrated FIG. 12, when the position pointing device 2 is brought in contact with the surface protecting layer 311, even if the surface protecting layer 311 is touched by fingers that grip the position pointing device 2, it is possible to effectively prevent a malfunction from occurring.

More specifically, even when the pen-point 22 of the pen-shaped position pointing device 2 is temporarily detached from the surface protecting layer 311 by a relatively large distance when the surface protecting layer 311 is touched by the fingers that grip the position pointing device 2, so long as the fingers that touch the surface protecting layer 311 are once completely detached from the surface protecting layer 311, touch input processing is not executed and the control circuit 601 is set to the standby mode in which the stylus input processing becomes possible. Accordingly, it is possible to prevent malfunction caused by the touch input according to a change in a temporary stylus input contact state.

While the position pointing device 2 is able to point to the specific position by transmitting and receiving a wireless signal to and from the position detecting unit 3 in the embodiments described above, the present invention is not intended to be limited to this arrangement. For example, the position pointing device 2 may include a built-in power supply apparatus so that the position pointing device 2 may transmit a signal to the position detecting unit 3 in a one-way fashion.

Also, while the embodiments of the present invention have been described as applied to a notebook-sized computer apparatus, it should be understood that the embodiments of the present invention can be applied to input devices connected to an information processing apparatus, such as a desktop-sized computer apparatus, among other devices. More specifically, the position detecting unit 3 including the first sense unit 31 and the second sense unit 32 may be constructed as a position detecting apparatus (input device) in which the position detecting unit 3 is housed within a single casing, and the position detecting apparatus may be connected to the information processing apparatus, such as a computer, by a suitable wire cable, such as a USB (universal serial bus) cable. Alternatively, the position detecting apparatus may transmit a signal to the information processing apparatus in a wireless fashion.

The embodiments of the present invention may also be applied to input units of a portable information processing apparatus, such as a PDA (personal digital assistant), an electronic dictionary, a mobile phone, and/or a portable game machine.

Also, while the first sense unit 31 has been described above as the electrostatic capacitance position detecting unit and the second sense unit 32 has been described as the electromagnetic position detecting unit, the embodiments of the present invention are not limited to this arrangement. The first sense unit 31 may be a position detecting unit capable of directly detecting contact or touch using other detecting mechanisms.

Figure 13:
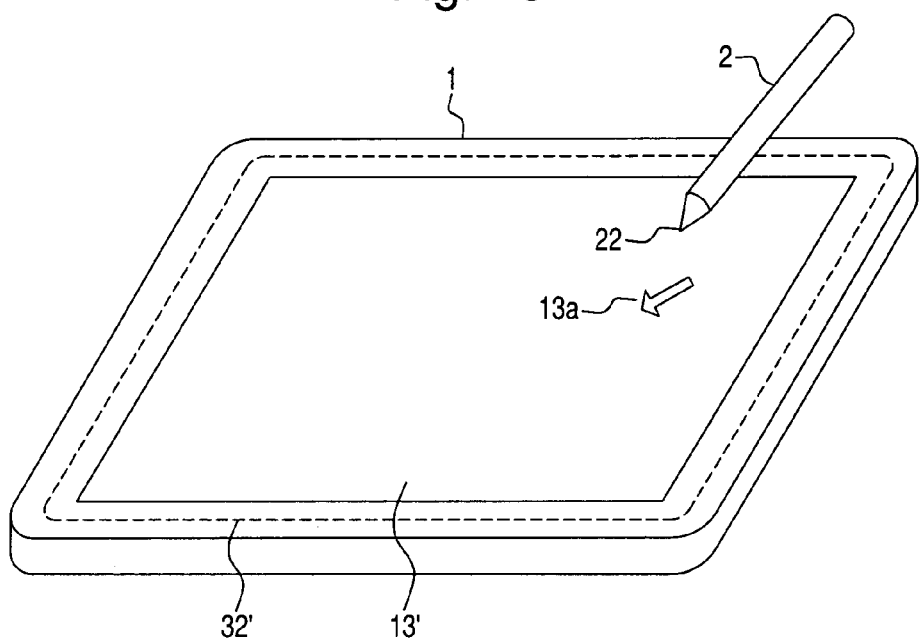
FIG. 13 is an perspective view illustrating a computer apparatus according to another embodiment of the present invention.

FIG. 13 is an external view illustrating a computer apparatus 1' according to another embodiment of the present invention. The computer apparatus 1' illustrated in FIG. 13 may be a tablet-type computer apparatus which can be operated by stylus input. The computer apparatus 1' includes a display panel 13', which may be a liquid-crystal display panel or an EL (electro-luminescence) display. The display panel 13' includes a first sense unit 31' (see FIG. 14) and a second sense unit 32' as operation input devices. It should be noted that the computer apparatus 1' may also include other operation input devices, such as a keyboard and a pointing device.

The first sense unit 31' is a position detecting apparatus for detecting a contact position (e.g., an absolute position or relative position) at which a surface of the display panel 13' is touched with a user's finger.

The second sense unit 32' is able to detect a position input operation performed by the position pointing device 2, which may be provided independently of the computer apparatus 1'.

The position pointing device 2 includes the pen-like casing 21 and the end (pen-point) 22 projecting from the end 22 of the pen-shaped casing 21. When the position pointing device 2 is in use, a user can hold the position pointing device 2 in exactly the same manner as an ink pen or stylus. In this manner, a user presses the end (or pen-point) 22 against the display surface of the display panel 13'. It should be noted that the position pointing device 2 in this embodiment of the present invention may or may not include a power supply such as a battery.

When operated by a user, the position pointing device 2 transmits a wireless signal to the second sense unit 32' due to operation of the resonance circuit 26 and the IC 25 disposed within the position pointing device 2 illustrated in FIG. 5.

The second sense unit 32' detects the position pointed to by the position pointing device 2 by receiving the wireless signal transmitted from the position pointing device 2. Also, based on the operation of the IC 25 and the resonance circuit 26, the position pointing device 2 detects stylus pressure applied to the pen-point 22, generates a signal indicative of stylus pressure level, and transmits the signal to the second sense unit 32' together with a signal which points to the position (i.e., a position pointing signal) based on operation of the IC 25 and the resonance circuit 26.

The second sense unit 32' detects the position pointed to by the position pointing device 2 and detects the stylus pressure applied to the pen-point 22 when receiving the signal transmitted from the position pointing device 2.

The first sense unit 31' is shaped and positioned to detect contact with substantially the same area as that of the display surface of the display panel 13'. The second sense unit 32' is shaped and positioned so as to detect whether the Position pointing device 2 is approaching or contacts the display surface of the display panel 13' in an area (indicated a broken line in FIG. 13) slightly larger than that of the display surface of the display panel 13'.

The first and second sense units 31' and 32' have flat detection surfaces which may be substantially square. Additionally, the detection surfaces of the first and second sense units 31' and 32' may have an imaginary X-Y orthogonal coordinates system defined therein for reference, in which a long side direction is assumed to be an X direction and a short side direction is assumed to be a Y direction.

The first and second sense units 31' and 32' are able to detect (1) the position at which a user's finger touches the display surface of the display panel 13' and (2) the position pointed to by the position pointing device 2, for example, as an absolute position or a relative position in the X-Y orthogonal coordinates system.

The computer apparatus 1' performs various functions by executing different application programs based on instructions from operation inputs detected by the first and second sense units 31' and 32'. When the application programs are executed, various display screens relating to data being processed are displayed on the display panel 13'. When the pointing of the position is detected by the first and second sense units 31' and 32', a displayed position of the pointer 13a displayed on the display panel 13' may be controlled or changed in response to the detected position. The displayed position of the pointer 13a may be changed based on display control of the CPU 41 (see FIG. 3).

Figure 14:
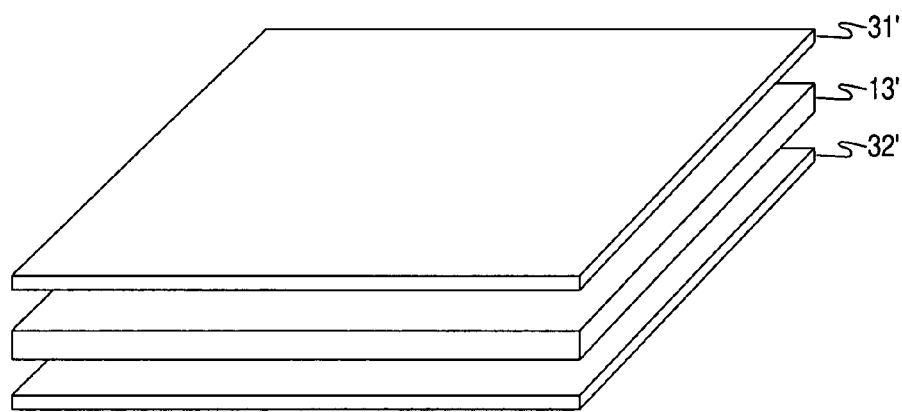
FIG. 14 is a perspective view illustrating a layout of the computer apparatus of FIG. 13, according to another embodiment of the present invention.

FIG. 14 is an exploded perspective view illustrating the computer apparatus 1'. As illustrated in FIG. 14, the first sense unit 31' is located on the display surface of the display panel 13' and the second sense unit 32' is located at a back side of the display panel 13'. The display panel 13' may be an LCD panel or other type of display device.

The first sense unit 31' includes a transparent substrate on which transparent electrodes are disposed. The second sense unit 32' may be slightly larger in size than the display surface of the display panel 13' such that its detection range is larger around a peripheral portion.

If the display panel 13' is a liquid-crystal display panel, for example, a backlight may be housed within the display panel 13', and the second sense unit 32' may be located on a back side of the backlight.

The first and second sense units 31' and 32' may incorporate therein circuit assemblies operable as the electrostatic capacitance position detecting unit 50 and the electromagnetic position detecting unit 60 of FIG. 3. More specifically, circuit assemblies operable as the detecting units may be mounted on the peripheral portion of the substrate constructing these sense assemblies, for example. Alternatively, a relatively small substrate in which circuit assemblies operable as detecting units are mounted may be connected to the peripheral portion of the substrate constructing the sense part and thereby formed as an integrated sense part.

A functional arrangement of the computer apparatus 1' may be the same as the arrangement that is described above with reference to FIG. 3. The computer apparatus 1' may be different only in that the display 13 shown in FIG. 3 is replaced with the display panel 13'.

Although not shown in FIGS. 13 and 14, the computer apparatus 1' may include the electrostatic capacitance position detecting unit 50 described above with reference to FIG. 4. In this case, the electrostatic capacitance position detecting unit 50 may include the first sense unit 31'. Similarly, although not shown in FIGS. 13 and 14, the computer apparatus 1' may include the electromagnetic position detecting unit 60 described above with reference to FIG. 4. In this case, the electromagnetic position detecting unit 60 may include the second sense unit 32'. The electromagnetic position detecting unit 60 includes the loop coils 322 and the loop coils 324 of the second sense unit 32' connected to the electromagnetic system detecting circuit 600.

The arrangement and detection operations of the electromagnetic system position detecting unit 60 are the same as those of the arrangement of the electrostatic capacitance system position detecting unit 60 that has been described so far with reference to FIG. 5 in the first embodiment of the present invention. More specifically, as shown in FIG. 5, the electromagnetic system position detecting unit 60 has an arrangement in which respective loop coils 612 and respective loop coils 613 of the second sense unit 32' are connected to an electromagnetic system detecting circuit (electromagnetic system detection function unit) 600. Each loop coil 612 is a coil located in the X-axis direction and each loop coil 613 is a coil located in the Y-axis direction.

The computer apparatus 1' includes the electrostatic capacitance position detecting unit 50 to detect position input operations performed by a user's finger and the electromagnetic position detecting unit 60 to detect position input operations performed by the position pointing device 2. Hence, the computer apparatus 1' is able to individually detect the position input operations performed by a user's finger on the display surface and the position input operations performed by the position pointing device 2. Consequently, it is possible to perform input operations using a plurality of methods with different feels of operation and operability can be improved.

Also, as shown in FIG. 14, since the first sense unit 31' which detects a user's finger and the second sense unit 32' which detects the position pointing device 2 are disposed on opposite sides of the display panel 13', embodiments of the present invention can be easily applied to small equipment having a casing size that is limited.

The input operation based on detection by the electrostatic capacitance position detecting unit 50 using the first sense unit 31' and the input operation based on detection by the electromagnetic position detecting unit 60 using the second sense unit 32' are prevented from being performed at the same time and only one input operation may be accepted based on operational states in order to prevent erroneous results. In some cases, both of the input operations may not be accepted.

Next, a state in which processing of an electrostatic capacity system contact detection at the first sense unit 31' and an electromagnetic contact detection or approach detection of the position pointing device 2 at the second sense unit 32' are selectively performed will be described below.

FIGS. 15A to 15D are cross-sectional views illustrating the display panel 13' of the computer apparatus 1' according to an embodiment of the present invention.

Figure 15A:
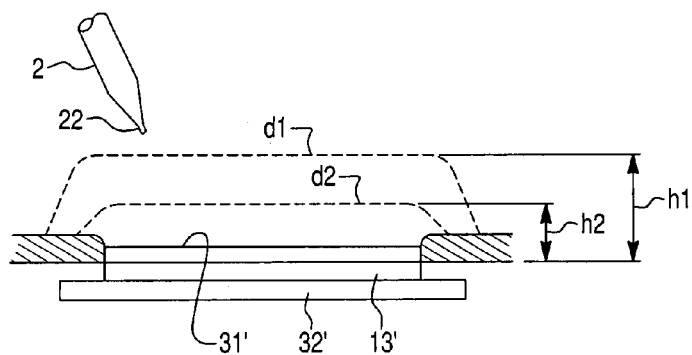
FIGS. 15A to 15D are cross-sectional views illustrating states in which a position pointing device is approaching detection ranges according to an embodiment of the present invention.

As shown in FIG. 15A, the first sense unit 31' and the second sense unit 32' are disposed on opposite sides (i.e., a display side and a rear side) of the display panel 13'. The first sense unit 31' is formed as the display surface of the display panel 13'.

The first sense unit 31' detects whether the surface of the display panel 13' is directly touched with a user's finger. The second sense unit 32' detects whether the end (pen-point) 22 of the position pointing device 2 approaches or contacts the surface of the display panel 13'.

In order to detect whether the end 22 of the pen-shaped position pointing device 2 approaches or contacts the surface of the display panel 13', as shown in FIG. 15A, the first detection range d1 is set to detect whether the pen-point 22 of the position pointing device 2 is less than the first height h1 from the surface of the display panel 13' and the second detection range d2 is set to detect whether the pen-point 22 of the position pointing device 2 is less than the second height h2 from the surface of the display panel 13'. The second height h2 is less than the first height h1.

Accordingly, the control circuit 601 (see FIG. 5) of the electromagnetic position detecting unit 60 determines whether the end 22 of the position pointing device 2 lies within the first detection range d1 and whether the end 22 of the position pointing device 2 lies within the second detection range d2. The first height h1 may be a height of approximately several centimeters and the second height h2 may be a height of approximately 1 cm.

The area of the second sense unit 32' is larger than that of the first sense unit 31', and the first and second detection ranges d1 and d2 extend beyond a peripheral portion of the display panel 13' where nothing is displayed.

The operational states shown in FIGS. 15A to 15D illustrate changes in positions of the end (pen-point) 22 of the position pointing device 2. The control circuit 601 (see FIG. 5) is able to discriminate among and detect these four states shown in FIGS. 15A to 15D, respectively.

Figure 15B:
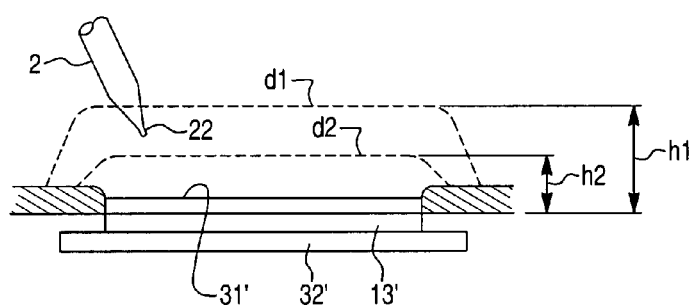
Figure 15C:
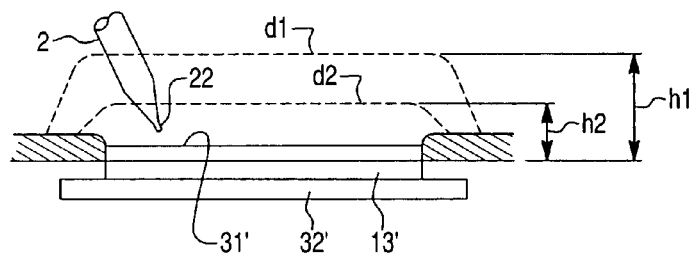

More specifically, FIG. 15A illustrates a state in which the end 22 of the position pointing device 2 lies outside of the first detection range d1. FIG. 15B illustrates a state in which the end 22 of the position pointing device 2 lies within the first detection range d1 and outside of the second detection range d2. FIG. 15C illustrates a state in which the end 22 of the position pointing device 2 lies within the second detection range d2. FIG. 15C illustrates a state in which the end 22 of the position pointing device 2 contacts the surface of the display panel 13'.

Figure 15D:
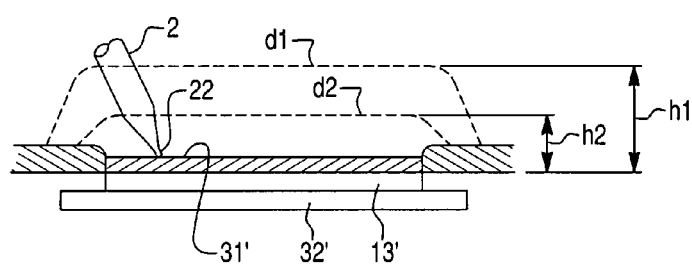

It should be noted that when the end 22 of the position pointing device 2 contacts the surface of the display panel 13' as shown in FIG. 15D, it is possible to determine the stylus pressure using the signal from the position detecting device 2.

As shown in FIGS. 15A to 15D, since the area of the second sense unit 32' is larger than that of the first sense unit 31', the first and second detection ranges d1 and d2 extend slightly further along a plane. According to this arrangement, even when the position pointing device 2 approaches the surface of the display panel 13' from a lateral direction, it is possible to positively detect the approach of the position pointing device 2 in the first and second detections ranges d1 and d2.

Then, based on the various types of detection states shown in FIGS. 15A to 15D, the control circuit 601 (see FIG. 5) issues an interrupt request to the input unit 45 of the computer apparatus 1'. When certain conditions are satisfied, input processing based on an output from the electromagnetic position detecting unit 60 (see FIG. 5) may be performed with priority over input processing based on an output from the electrostatic capacity position detecting unit 50 (see FIG. 5).

The switching between the touch input and the stylus input which is described above with reference to the flowcharts shown in FIGS. 7 and/or 8 may be applied to the input processing selection states based on the outputs from the two detecting units 50 and 60.

Referring to FIGS. 7 and 15A to 15D, it is determined at step S11 whether the end 22 of the position pointing device 2 is inside of the first detection range d1. If the end 22 of the position pointing device 2 lies outside of the first detection range d1 as represented by a "NO" at step S11, then the control circuit 601 of the electromagnetic position detecting unit 60 (see FIG. 5) is set to the standby mode in which only the touch input is enabled. If on the other hand the pen-point 22 of the position pointing device 2 is determined to be inside of the first detection range d1 as represented by a "YES" at the decision step S11, then step S12 is performed. In step S12, preparation processing for a stylus input is performed. The preparation processing is performed such that it can be quickly determined whether the end 22 of the position pointing device 2 lies within the second detection range d2.

Then, step S13 is performed, in which it is determined whether the end 22 of the position pointing device 2 is inside of the second detection range d2. If the end 22 of the position pointing device 2 is determined to be inside of the second detection range d2 as represented by a "YES" at step S13, then step S14 is performed. In step S14, the touch input and touch input processing is inhibited (i.e., disabled).

At step S15, detection data of the stylus input processing is supplied to the input unit 45 and display control based on the detection data is performed. Next, step S16 is performed in which the display control processing corresponding to a distance of the end 22 of the position pointing device 2 from the display panel 13' and the stylus pressure is performed.

At step S17, it is determined whether the end 22 of the position pointing device 2 is moved outside of the second detection range d2. If the end 22 of the position pointing device 2 is not outside of the second detection range d2 (that is, the end 22 of the position pointing device 2 lies within the second detection range d2) as represented by a "NO" at step S17, then steps S14 to S16 are repeatedly performed.

If on the other hand, the end 22 of the position pointing device 2 is determined to have been moved outside of the second detection range d2 as represented by a "YES" at step S17, then step S18 is performed. At step 18, detection data is not supplied to the input unit 45 and the control circuit 601 of the electromagnetic position detecting unit 60 (see FIG. 5) is set to the standby mode and step S13 is performed.

If it is determined at step S13 that the end 22 of the position pointing device 2 does not lie within the second detection range d2, then step S19 is performed. In step S19, it is determined whether the end 22 of the position pointing device 2 is moved outside of the first detection range d1. If the end 22 of the position pointing device 2 is not outside of the first detection range d1 as represented by a "NO" at step S19, then step S13 is performed again. If on the other hand, the end 22 of the position pointing device 2 is moved outside of the first detection range d1 as represented by a "YES" at step S19, then step S20 is performed. At step S20, the control circuit 601 of the electromagnetic position detecting unit 60 (see FIG. 5) returns to the state in which the touch input processing is enabled. Then, the preparation processing for the stylus input is stopped at step S21 and step S11 is performed again.

Referring to FIGS. 8 and 15A to 15D, it is determined at step S11 whether the end 22 of the position pointing device 2 is inside of the first detection range d1. If the end 22 of the position pointing device 2 is determined to be inside of the first detection range d1 as represented by a "YES" at step S11, then step S14 is performed. At step S14, the touch processing is inhibited (i.e., disabled). Next, step S12 is performed, in which preparation processing to enable the stylus input processing is performed.

At step S13, it is determined whether the end 22 of the position pointing device 2 is inside of the second detection range d2. If the end 22 of the position pointing device 2 is determined to be inside of the second detection range d2 as represented by a "YES" at step S13, then step S15 is performed. At step S15, detection data from the stylus input is supplied to the input unit 45 and display control based on the detection data is performed. Then, step S16 is performed in which display control based on the distance of the end 22 of the position pointing device 2 from the display panel 13' and the stylus pressure is performed. A remainder of the method of FIG. 8 may be similar to the flowchart shown in FIG. 7.

In the present embodiment of the invention, the method shown in FIG. 9 and the method shown in FIG. 10 can be applied at the step S16 in the flowcharts of FIGS. 7 and 8 in the same manner as applied above to previous embodiments.

Also, the methods shown in FIGS. 11 and 12 can be applied when the touch input is being detected in FIG. 11 and when the stylus input is being detected in FIG. 12.

It should be noted that while the position pointing device 2 points the position by transmitting and receiving the wireless signal between it and the second sense unit 32', the present invention is not limited thereto. For example, the position pointing device 2 may include a built-in power supply so that the position pointing device 2 may transmit a signal to the second sense unit 32' in a one-way fashion.

It should be understood that while the first sense unit 31' of the electrostatic capacity position detection is located on the surface of the display panel 13', and the second sense unit 32' of the electromagnetic position detection is located at the back side of the display panel 13' as shown in FIG. 14, the present invention is not intended to be limited to this arrangement. The first and second sense units 31' and 32' may be located on the surface of the display panel 13', respectively. In this case, both of the first and second sense units 31' and 32' may be combined together.

Figure 16:
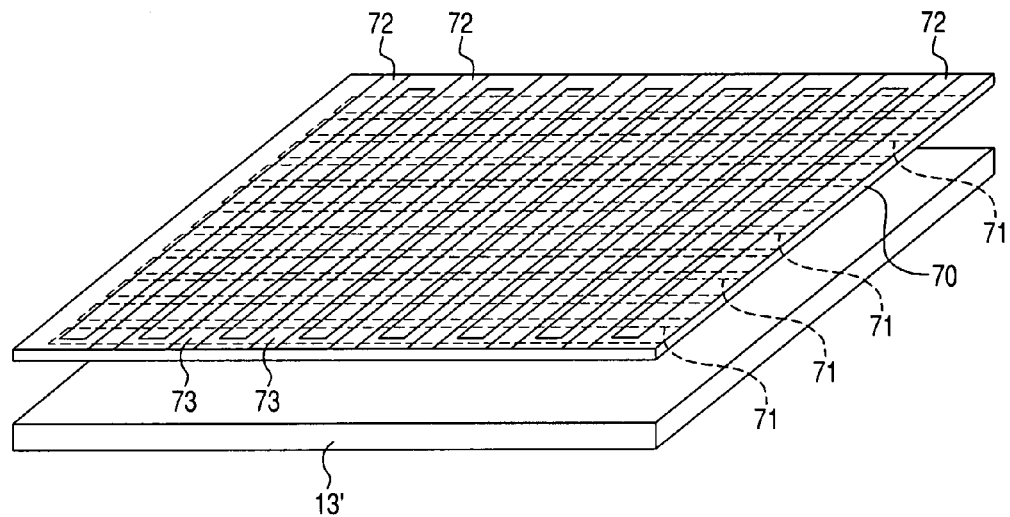
FIG. 16 is a perspective view illustrating parts of a computer apparatus according to another embodiment of the present invention.

FIG. 16 illustrates an arrangement in which a combined sense unit 70 is located on the surface of the display panel 13'. As shown in FIG. 16, the combined sense unit 70 includes a transparent substrate which covers the surface of the display panel 13', a plurality of X-axis coil units 71 formed of transparent electrodes, and a plurality of electrostatic capacitance sensors 73 formed of transparent electrodes disposed on the surface of the transparent substrate.

The X-axis coil units 71 and the electrostatic capacitance sensors 73 may be disposed in an alternating manner on the surface of the transparent substrate. The X-axis coil units 71 and the electrostatic capacity sensors 73 are each formed of an elongated transparent electrode so as not to hinder display on the display panel 13'.

A plurality of Y-axis coil units 72 is disposed at a back side of the transparent substrate of the combined sense unit 70. The Y-axis coil units 72 may be perpendicular to the X-axis coil units 71. The Y-axis coil units 72 may also be formed of elongated transparent electrodes.

The X-axis coil unit 71 and the Y-axis coil unit 72 correspond to the loop coils 322 and 324 shown in FIG. 5, respectively, and are connected to a circuit having an arrangement similar to that shown in FIG. 5 to detect a position of the position pointing device 2.

According to the arrangement shown in FIG. 16, since the combined sense unit 70 is disposed on the surface of the display panel 13' and executes two detection operations, it is possible to simplify the structure of the system.

Also, when the combined sense unit 70 is in use, a first sense unit for the electrostatic capacitance position detection and a second sense unit for the electromagnetic position detection can use a common sensing unit. That is, the first sense unit can detect whether the surface is directly touched with a finger and the second sense unit can detect an approach and/or contact by the position pointing device 2 using the same coil disposed on the surface of the display panel 13'.

More specifically, the same coil may be alternately connected to a first sense unit detection circuit and a second sense unit detection circuit in a time-sharing manner at a relatively short cycle so that the detection of whether the surface of the display panel 13' is directly touched with a finger and the detection of the position pointing device 2 can be performed substantially at the same time. Then, the switching between touch input processing and stylus input processing similar to the processing described above can be performed based on the operation of the two detecting circuits. Accordingly, it is possible to further simplify the arrangement of the coils and/or electrostatic sensors of the sense unit.

Figure 17:
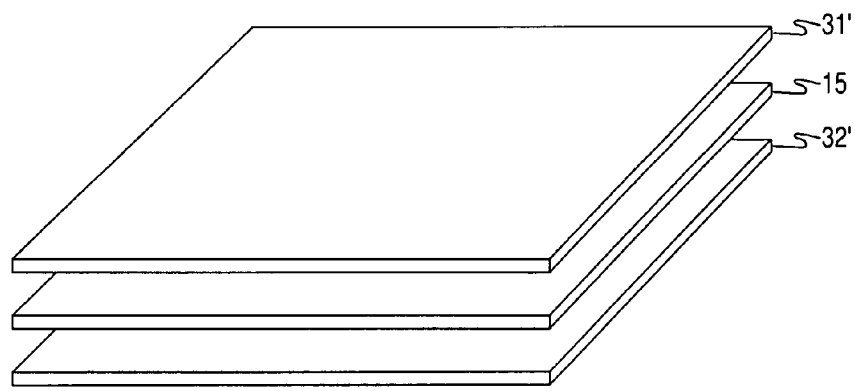
FIG. 17 is a perspective view illustrating parts of a computer apparatus according to an embodiment of the present invention.

Also, while the display panel 13' is described as being a liquid-crystal display panel in the present embodiment, the present invention is not intended to be limited to this arrangement. The display panel 13' may be applied to other display devices. For example, as shown in FIG. 17, an electronic paper 15 may be used as the display device. The electronic paper 15 is a display device which is driven only when the display is changed and which can maintain the display without application of a signal. The electronic paper 15 may be constructed by using a flexible substrate.

When the electronic paper 15 is in use, as shown in FIG. 17, a first sense unit 31' is disposed on a display surface thereof and a second sense unit 32' is disposed on a back side thereof. Alternatively, as shown in FIG. 16, a combined sense unit may be located only on the display surface of the electronic paper 15. The circuits connected to the first sense unit 31' and the second sense unit 32' may have the same arrangements as those described in previous embodiments.

When the electronic paper 15 is constructed using the flexible substrate, the first sense unit 31' and the second sense unit 32' may also be constructed using the flexible substrates.

When the electronic paper is in use as described above, it is possible to carry out satisfactory input detection and operation.

Alternatively, the devices including the display apparatus can be applied to equipment other than the computer apparatus. That is, the above-mentioned first and second sense units may be disposed on the display portion (display panel) of the information processing apparatus such as a PDA (personal digital assistant), a mobile phone and a portable game machine to which the present invention can be applied.

The present invention may be embodied as executable code in computer readable media including storage media such as magnetic storage media (ROMs, RAMs, floppy disks, magnetic tapes, etc.), optically readable media (CD-ROMs, DVDs, etc.), and carrier waves (transmission over the Internet). For example, operation of the computer apparatus 1 (or 1') and/or the control circuit 601 of the electromagnetic position detecting unit 60 may be controlled by executable code.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An information processing apparatus, comprising: an operation surface; a first sense unit for electrically detecting whether said operation surface is being directly touched; a second sense unit for detecting whether a position pointing device approaches or contacts said operation surface based on an electromagnetic interaction generated between the position pointing device and said second sense unit; an approach detecting unit for detecting whether the position pointing device is within a first detection range from said operation surface and whether the position pointing device is within a second detection range based on an output from said second sense unit, the first detection range extending further from said operation surface than said second detection range; and a display control unit for disabling display processing based on a detection output from said first sense unit and for enabling display processing based on a detection output from said second sense unit if said approach detecting unit determines that the position pointing device is within of said second detection range.

2. The information processing apparatus according to claim 1, wherein said second sense unit is located under said first sense unit.

3. The information processing apparatus according to claim 1, wherein said second sense unit has an area that is greater than an area of said first sense unit.

4. The information processing apparatus according to claim 1, wherein: said display control unit continuously disables display processing based on the detection output from said first sense unit if it is determined by said first sense unit that said operation surface is touched when the position pointing device is moved outside of said second detection range from a state in which the position pointing device lies within said second detection range; and said display control unit enables display processing based on the detection output from said first sense unit if said first sense unit determines that said operation surface is not touched.

5. The information processing apparatus according to claim 1, wherein said display control unit enables the display processing to be performed based on the detection output from said first sense unit if said approach detecting unit determines that the position pointing device is not within the first detection range, disables the display processing based on the detection output from said first sense unit if it is determined that the position pointing device is within the first detection range from said operation surface, and enables the display processing to be performed based on the detection output from said second sense unit if it is determined that the position pointing device lies within said second detection range.

6. The information processing apparatus according to claim 5, wherein said display control unit begins preparation processing of said second sense unit to detect a position at which the position pointing device approaches or contacts said operation surface if it is determined that the position pointing device approaches within the first detection range from said operation surface.

7. The information processing apparatus according to claim 5, wherein said display control unit performs display processing based on a distance from the operation surface if it is determined that the position pointing device approaches within the second detection range from said operation surface.

8. An operation input method of accepting input at an operation surface of an information processing apparatus, the method comprising: a first detection processing for electrically detecting whether the operation surface is directly touched; a second detection processing for detecting whether a position pointing device approaches or contacts the operation surface based on an electromagnetic interaction with the position pointing device; an approach detection processing for detecting whether the position pointing device approaches within a first detection range from the operation surface and whether the position pointing device approaches within a second detection range based on an output from said second detection processing, the first detection range extending further from the operation surface than the second detection range; and a display control processing for disabling display processing based on a detection output from said first detection processing if said approach detection processing determines that the position pointing device approaches the second detection range, and for enabling display processing based on a detection output from said second detection processing if said approach detection processing determines that the position pointing device approaches within the second detection range.

9. The operation input method according to claim 8, wherein the display control processing enables the display processing based on the detected output of said first detection processing to be performed if said second detection processing determines that the position pointing device does not approach within the first detection range from the operation surface, disables the display processing based on the detected output of said first detection processing if it is determined that the position pointing device approaches within the first detection range from the operation surface, and enables the display processing based on the detected output of said second detection processing to be performed if it is determined that the position pointing device is within the second detection range which is closer to the operation surface than said first detection range.

10. An information processing apparatus having a display device with a display surface operable as an operation surface, the apparatus comprising: a sense unit formed on a transparent substrate and having a first sensor electrode disposed on the display surface of said display device to electrically detect whether said display surface is directly touched and a second sensor electrode to detect whether a position pointing device approaches or contacts said display surface based on an electromagnetic interaction generated between said second sensor electrode and the position pointing device; an approach detecting unit for detecting whether the position pointing device is located within a first detection range from said display surface and whether said position pointing device is located within a second detection range based on an output from said second sensor electrode, the second detection range being closer to said display surface than the first detection range; and a display control unit for disabling display processing at said display device based on an output from said first sensor electrode and for enabling said display device to perform display processing based on an output from said second sensor electrode if said approach detecting unit determines that the position pointing device is within the second detection range.

11. The information processing apparatus according to claim 10, wherein said first sensor electrode and said second sensor electrode are a common electrode located on the display surface of said display device, said common electrode being used as said first sensor electrode to detect whether said display surface is directly touched and as said second sensor electrode to detect whether the position pointing device approaches or contacts said display surface in a time-sharing manner.

12. The information processing apparatus according to claim 11, wherein at least part of said first sensor electrode and said second sensor electrode are alternately located on a transparent substrate of said sense unit.

13. A sensing device usable with an information processing apparatus, the device comprising: an operation surface having a predefined first detection region and a predefined second detection region disposed thereabove; and a sensing unit having a plurality of detection mechanisms to sense a position of a position pointing device with reference to the first and second detection regions and to selectively operate the detection mechanisms based on the sensed position of the position pointing device with reference to the first and second detection regions, wherein the second detection region is a second predetermined height and extends along the operation surface slightly beyond a perimeter of the operation surface, and the first detection region contains the second detection region therein and is a first predetermined height and extends along the operation surface substantially beyond the perimeter of the operation surface.

14. The sensing device according to claim 13, further comprising: a control unit to perform a first detection processing operation when the position pointing device is determined to be in the first detection region, a second detection processing operation when the position pointing device is determined to be in the second detection region, and a third detection processing when the position pointing device is determined to be in neither one of the first and second detection regions.

15. The sensing device according to claim 13, wherein the detection mechanisms include an electromagnetic detection unit having a plurality of loop coils and an electrostatic detection unit including a plurality of sensing electrodes, the detection mechanisms residing below the operation surface in the information processing apparatus.

16. The sensing device according to claim 13, wherein the sensing unit disables and enables the detection mechanisms based on the sensed position of the position pointing device such that an input from only one detection mechanism is processed at any given time.

17. The sensing device according to claim 13, wherein a first detection mechanism senses a touch input and a second detection mechanism senses a position pointing device input, and the sensing unit prioritizes the position pointing device input when the position pointing device is detected within the first and second detection ranges.

18. The sensing device according to claim 13, wherein the first detection region is further away from the operation than the second detection region.

19. The sensing device according to claim 13, wherein the information processing apparatus is one of a lap top computer, a notebook computer, a tablet computer, and an electronic paper device.

20. The sensing device according to claim 13, wherein the detection mechanisms comprise a first detection mechanism and a second detection mechanism disposed on opposite sides of a display panel.

21. The sensing device according to claim 13, wherein the detecting mechanisms include first and second detection mechanisms integrally formed with one another on the operation surface.

22. A sensing device usable with an information processing apparatus, the device comprising: an operation surface having a predefined first detection region and a predefined second detection region disposed thereabove; and a sensing unit having a plurality of detection mechanisms to sense a position of a position pointing device with reference to the first and second detection regions and to selectively operate the detection mechanisms based on the sensed position of the position pointing device with reference to the first and second detection regions, wherein the detection mechanisms include a contact sensor to detect contact on the operation surface and an approach sensor to detect an approach of the position pointing device, the detection mechanisms distinguishing between a first state in which the position pointing device contacts the operation surface, a second state in which the position pointing device is disposed in the first detection region, a third state in which the position pointing device is disposed in the second detection region, and a fourth state in which the position pointing device is not disposed in either of the first and second detection regions.

23. A method of controlling a sensing device having at least two detecting mechanisms disposed below an operation surface in an information processing apparatus, the method comprising: detecting a distance of a pointing device from the operation surface using a first detection mechanism with reference to first and second detection regions above the operation surface; if the position pointing device is in the first detection region, preparing the first detection mechanism to determine a coordinate position of the position pointing device with respect to the operation surface; if the position pointing device is in the second detection region, enabling the first detection mechanism to determine the coordinate position of the position pointing device with respect to the operation surface and enabling processing of the determined coordinate position; and if the position pointing device is in neither one of the first and second detection regions, enabling a second detection mechanism to determine a coordinate position of contact on the operation surface and enabling processing of the determined coordinate position of the contact.

* * * * *